United States Patent
Shiomi et al.

(10) Patent No.: US 7,321,842 B2
(45) Date of Patent: Jan. 22, 2008

(54) CHAOS INDEX VALUE CALCULATION SYSTEM

(75) Inventors: Kakuichi Shiomi, 401, Metro Building, 5-11, Higashi-shimbashi 2-chome, Minato-ku, Tokyo, 105-0021 (JP); Susumu Kobayashi, Migawa-Mansion 206, 85-2, Migawa 2-chome, Mito-shi, Ibaraki 310-0912 (JP)

(73) Assignees: Electronic Navigation Research Institute, an Independent Admiinistrative Institution, Tokyo (JP), part interest; Kakuichi Shiomi, Tokyo (JP), part interest; Susumu Kobayashi, Ibaraki (JP), part interest (*) Notice: Subject to any disclaimer, the term of this patent is extended or adjusted under 35 U.S.C. 154(b) by 0 days.

(21) Appl. No.: 10/546,479
(22) PCT Filed: Dec. 26, 2003
(86) PCT No.: PCT/JP03/16954
§ 371 (c)(1),
(2), (4) Date: Jul. 21, 2006
(87) PCT Pub. No.: WO2004/075074
PCT Pub. Date: Sep. 2, 2004

(65) Prior Publication Data
US 2006/0265444 A1 Nov. 23, 2006
US 2007/0174377 A2 Jul. 26, 2007

(30) Foreign Application Priority Data
Feb. 24, 2003 (JP) .............................. 2003-045386

(51) Int. Cl.
G06F 19/00 (2006.01)
(52) U.S. Cl. ...................................... 702/181; 714/25
(58) Field of Classification Search ................ 702/181, 702/182–185; 714/4, 100, 5, 25, 30, 48
See application file for complete search history.

(56) References Cited

U.S. PATENT DOCUMENTS 6,422,998 B1 * 7/2002 Vo-Dinh et al. ............. 600/300
6,904,390 B2 * 6/2005 Nikitin et al. ............... 702/188

FOREIGN PATENT DOCUMENTS

JP 7116119 5/1995

(Continued)

OTHER PUBLICATIONS

M. Sano and Y. Sawada "Measurement of the Lyapunov Spectrum from a Chaotic Time Series," Physical Review Letters, vol. 55, No. 10, Sep. 2, 1985, pp. 1082-1085.

(Continued)

*Primary Examiner*—Edward Raymond
(74) *Attorney, Agent, or Firm*—Finnegan, Henderson, Farabow, Garrett & Dunner, L.L.P.

(57) ABSTRACT

The present invention provides a system for analyzing a time series signal by a method of Chaos Theory and calculating a chaos theoretical exponent value.

It is a chaos theoretical exponent value calculation system comprising: a means for receiving an input of predetermined parameters, a means for reading a time series signal, a means for cutting out from the read time series signal a time series signal for each processing unit $x=x(i)$, a means for calculating a chaos theoretical exponent value of the read time series signal, and a means for outputting a chaos theoretical exponent value of the calculated time series signal, wherein the means for calculating a chaos theoretical exponent value comprises: a means for calculating a chaos theoretical exponent value for a sampling time in a time series signal of the cut-out processing unit $x=x(i)$, and a means for calculating, based on the chaos theoretical exponent value for the sampling time, a chaos theoretical exponent value of a time series signal for a predetermined time.

27 Claims, 12 Drawing Sheets

FOREIGN PATENT DOCUMENTS

| | | |
|---|---|---|
| JP | 7231880 | 9/1995 |
| JP | 9259107 | 10/1997 |
| JP | 9308614 | 12/1997 |
| JP | 11212949 | 8/1999 |
| JP | 2000113347 | 4/2000 |
| JP | 2002306492 | 10/2002 |
| WO | WO 02/085215 A1 | 10/2002 |

OTHER PUBLICATIONS

Holger Kantz and Thomas Schreiber, "Nonlinear Time Series Analysis,", Cambridge Nonlinear Science Series 7, 1997.

* cited by examiner

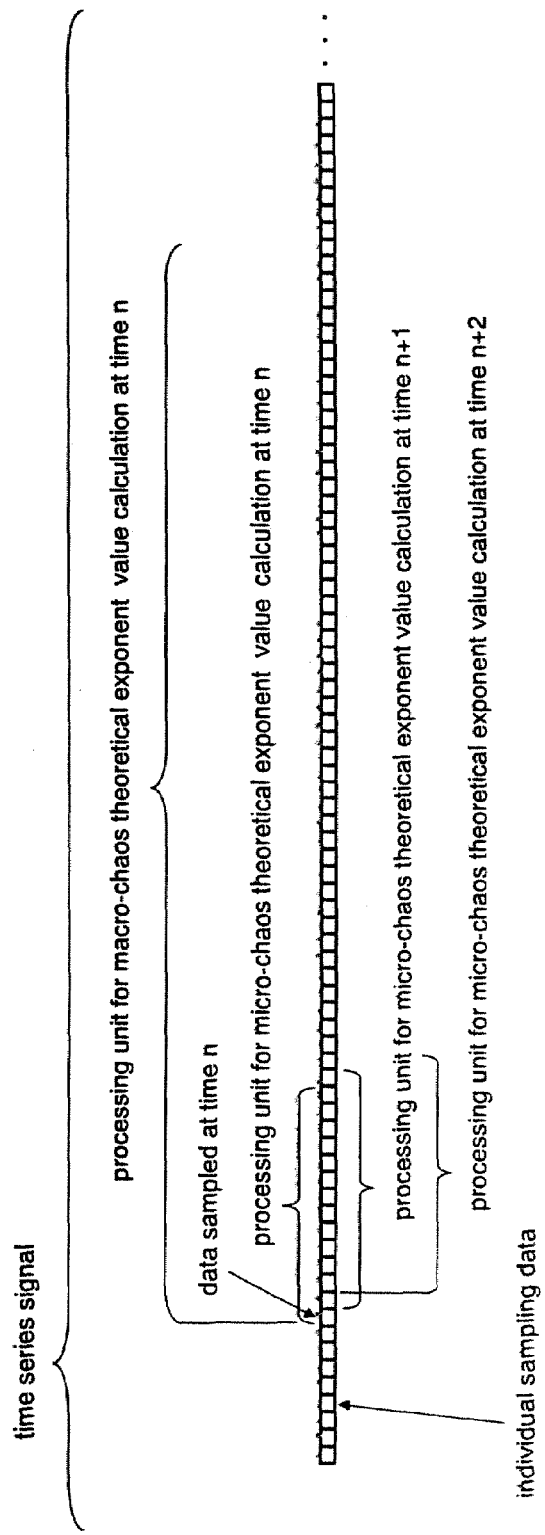

CHAOS INDEX VALUE CALCULATION SYSTEM

TECHNICAL FIELD

The present invention relates to a system for analyzing a time series signal by a method based on Chaos Theory and calculating a chaos theoretical exponent value thereof.

BACKGROUND ART

There are chaos theoretical exponent values in accordance with the Chaos Theory such as a correlative dimension, KS entropy, Lyapunov exponent and the like. The Lyapunov exponents, which are relatively easier to be calculated, are used for the assessment of chaoticity of a phenomenon which gives a time series signal. It is common to analyze a time series signal, in particular a signal having periodic characteristics such as a speech voice, by calculating a first Lyapunov exponent or a Lyapunov spectrum.

The maximum Lyapunov exponent, or the first Lyapunov exponent in the Lyapunov spectra, is calculated in general in order to determine the chaoticity of a time series signal (here the chaoticity means the characteristics of fluctuations or the characteristics due to fluctuations specific to a system). The system used to calculate the exponents includes systems in accordance with various procedures such as Wolf's algorithm, Kantz' algorithm, Rosenstein's algorithm, Orel's algorithm, Sano/Sawada's algorithm and the like. The system in accordance with Sano/Sawada's algorithm is a typical example among these.

When using the system in accordance with any one of those algorithms, the system evaluates an attractor constructed in a phase space from a time series signal, and the Lyapunov exponent to be calculated is calculated with respect to the neighborhood points set constructed in the attractor, the value of which depends on the constituting method of the neighborhood points set. In order to calculate a correct Lyapunov exponent, it is very important that a manifold that includes the neighborhood points set (spheres and cubes and the like in a third dimension, hyperspheres and hypercubes and the like in a fourth dimension) is appropriately set with respect to the size of the attractor. In case where the time series signal includes noises which disturb its chaoticity, the appropriate range of the size of the manifold which includes the neighborhood points set with respect to the size of the attractor, is known to become smaller. From these facts, the evaluation of the level of noises that disturb the chaoticity, and that are included in the time series signal is made possible, by varying the size of the manifold which includes the neighborhood points set and checking the relationship with the calculated Lyapunov exponents.

Examples of such prior art include "Nonlinear Time Series Analysis" by Holger Kantz and Thomas Schreiber, UK, Cambridge Nonlinear Science Series 7, 1997, and "Measurement of the Lyapunov Spectrum from a Chaotic Series" by Sano M. and Sawada Y., Physical Review Letters, vol. 55, No. 10, 1985, pp. 1082-1085, JP-A-H07-116119, JP-A-H09-259107, JP-A-H09-308614, JP-A-H11-212949, JP-A-2000-1133347 and JP-A-2002-306492.

The Lyapunov exponents in general are calculated for the evaluation of chaoticity in a time series signal, and thus evaluated time series signal is said to be chaotic when the maximum Lyapunov exponent or the first Lyapunov exponent in the Lyapunov spectrum is positive.

The Lyapunov exponents or in general the Lyapunov spectra are calculated with respect to the strange attractors constructed in an embedding space for which a dimensions is set preliminarily, from the time series signal. In the calculation system, which may be of any kind, it calculates the maximum Lyapunov exponent, or the Lyapunov spectra in the system using the Sano/Sawada's algorithm, from the relative position relationships of many or all of the points that constitute the strange attractor.

The maximum Lyapunov exponent, or the first Lyapunov exponent in the Lyapunov spectrum (referred to simply as the first Lyapunov exponent or Lyapunov exponent hereinbelow) is an exponent for the dispersion velocity when each point neighboring one other on the strange attractor separates from each other with the passage of time.

In any of the systems, the Lyapunov exponents constitute the neighborhood points set generated from the neighborhood condition to be set as the ratio with respect to its size on the strange attractor constructed in the embedding space, and are calculated as the mean value when points constituting the neighborhood points set separate from each other.

The conventional chaos theoretical exponent value calculation system uses one of such systems as mentioned above, and those systems have a presumption that it analyses a system of stable dynamics (the dynamics is the behavior limited by its physical form and the like or the property that provides the behavior) (a system of stable dynamics means a system with physically invariable disposition or length, and the shape of strange attractor generated from the time series signal provided by the system becomes a similar form if such a system behaves chaotically). Thus the temporally local first Lyapunov exponent in the system with its temporally changing dynamics, or the Lyapunov spectrum in the Sano/Sawada's algorithm, cannot be calculated as a significant value (a system with its temporally changing dynamics refers to a system such as the human vocal organs, for example, in which the physical disposition or length changes. For instance, when phonemes /a/ and /o/ are pronounced, the shapes of throat and oral cavity are different, and the strange attractors thereof generated from the speech voice signal are different. The shape of a strange attractor for the phoneme /a/ is shown in FIG. 8, while the shape of a strange attractor of the phoneme /o/ is shown in FIG. 9. The strange attractor of /o/ cannot be obtained even when the fluctuation of strange attractor of the phoneme /a/ is enlarged or noises are added thereto).

For instance, in the analysis of a generic speech voice signal and the like, which is an exemplary system with a temporally changing dynamics, because a plurality of vowels change in a complex manner in a short period of time, the difficulty of analysis is extreme when compared with the system using a conventional methodology. So far it is almost impossible to calculate a temporally local first Lyapunov exponent in a system with a temporally changing dynamics such as an ordinary speech voice signal.

Even with a system which calculates the temporally local first Lyapunov exponent by combining the above-mentioned method with a statistical procedure, when the system uses any one of conventional methods for the calculation of the first Lyapunov exponent, it is not easy to sufficiently reduce the processing unit time as compared to the required temporal resolution, while obtaining stable processing results.

For example, in a combination of conventional methods, it is difficult to secure the chaos theoretical exponent value for a short period of time not more than one second at an effective precision, and the first Lyapunov exponent can be calculated only when the signal to be processed has a sufficient SNR (signal-to-noise ratio), namely when a signal consisting of a clear single vowel by one unique speaker can be processed in case where the time series signal is a speech voice signal. More specifically, if the SNR of the signal to be processed is poor or a plurality of phonemes are mixed, then the calculation of the first Lyapunov exponent can not be performed.

The voice (signal) for one period of time of processing unit is needed to be first extracted from a continuous speech voice (a signal to be subjected to an analysis), namely a system with temporally changing dynamics, when executing the processing of a continuous speech voice in a conventional system, although any one of the conventional systems is applied. In case when it is decided that the voice (signal) is input to the system from a tape recorder, and if the system mechanically chops the voice to be processed (a signal to be processed) for the size of processing unit time, tens of milliseconds of difference in timing of depressing the play button of the tape recorder will result in several tens percent of change in the first Lyapunov exponent, which is calculated from the voice signal contained in each processing unit, as a processing result.

For example, in case when a continuous speech voice is to be processed, and when it is decided that the processing unit is one second, a difference of the cutting-out timing of 0.1 second will cause 10 to 30% of change in the first Lyapunov exponent per each second even with the system using the Sano/Sawada's algorithm, which is reputed to be able to calculate at a relatively high precision in the conventional systems, so that the difference of the temporal mean value of the first Lyapunov exponents will be not less than a few percent, which difference is caused by the 0.1 second of difference of the cutting-out timing of the processing unit, in case where the time slice width for calculating temporal mean values is approximately 5 minutes, even when change is averaged temporally so as to be reduced.

On the other hand, the temporal mean value of the first Lyapunov exponents of a speech voice is thought to have a close correlation with the fatigue level accumulated in the speaker, and is thought to be able to evaluate the stresses with respect to each of speech contents of the speaker from the speech voice, if the time slice used to calculate the temporal mean value is further shorten. However, as it is clear from the foregoing description, in the conventional methods, it is not possible to make the temporal resolution to not more than 5 minutes, as well as it is limited to only quantize the mid- to long term stresses if the reliability of index value is in only one significant digit, thus the real time or quasi real time evaluation of stresses in the speech of a speaker is impossible. Therefore a stable processing result cannot be obtained from a continuous speech voice (i.e., from a system with a temporally changing dynamics). The term "stable" means that the processing result does not almost vary by a minute change of parameters.

In order to only verify that the first Lyapunov exponent has a positive value for the purpose of verifying the chaoticity of the time series signal, it is not necessarily needed to be specially nervous about the neighborhood condition, and rather it is sufficient to set the neighborhood condition in such a way that a sufficient number of neighborhood points exist, for example in such a way that the radius of a neighborhood sphere (or a neighborhood hypersphere) is in the order of a few percent of the radius of a sphere (or a hypersphere) that includes the strange attractor. However, it will be quite important to appropriately set the neighborhood condition if one desires an exact calculation of the Lyapunov exponent.

In particular, if some noises such as white noises for some reason or other, such as by the precision level of the measuring system, are convoluted on a chaotic time series signal, the setting of neighborhood condition for accurate calculation of the Lyapunov exponent of the system for which the time series signal is provided will be very complex, when compared to the processing of an ideally chaotic time series signal.

When the neighborhood condition is set to the radius ($\epsilon$) of the neighborhood sphere as stated in the above example, the first Lyapunov exponent will be correctly calculated in the range $\epsilon_0 < \epsilon < \epsilon_1$, as schematically shown in FIG. 5, for an ideally chaotic time series signal. If on the other hand white noises are convoluted thereon, then the relationship between the radius of neighborhood sphere and the first Lyapunov exponent calculated pro form a will vary based on the ratio as schematically shown in FIG. 6, and if stronger noises are convoluted the first Lyapunov exponent cannot be calculated as similar to the case of FIG. 5.

It may be sufficiently reasonable to consider that some noises are included, even when the voice is a simple continuous phoneme of /a/ in a speech voice, for example, thus there exists a problem that the Lyapunov exponent of the voice system that produces the phoneme /a/ cannot be correctly calculated as compared to the calculation of the Lyapunov exponent of the system from a time series signal generated by a mathematical system.

SUMMARY OF THE INVENTION

As have been described above, the inventors of the present invention have invented a system which makes it possible to calculate a chaos theoretical exponent value that could not have been so far processed in a dynamics-changing system and to perform the process thereof at a high-speed and on a real-time basis. In addition, the inventors have invented a system which makes it possible to calculate a chaos theoretical exponent value even from a time series signal which includes noises.

In addition, as one of problems, the system is characterized in that it cuts out the section where the signal waveforms (voice signal waveforms) and the like are locally stable, in the cutting out of data for a processing unit from a time series signal. The inventors have invented a chaos theoretical exponent value calculation system which is thereby highly reliable in the calculation of the temporally local first Lyapunov exponent (referred to as a chaos theoretical exponent value hereinafter. The chaos theoretical exponent value is an exponent indicating how the chaoticity is disturbed with respect to a time series signal) which corresponds to the first Lyapunov exponent in the conventional techniques, from the cut-out signals.

The chaos theoretical exponent value, as mentioned above, is an exponent denoting the intensity of chaoticity in a time series signal along with the intensity of a noise which disturbs the chaoticity, and the ratio of relative intensities, which will be calculated by the chaos theoretical exponent value calculation system in accordance with the present invention (which will be referred to as SiCECA. SiCECA is the name of the chaos theoretical exponent value calculation system in accordance with the present invention. The SiCECA neighborhood distance described later refers to a value defined in the chaos theoretical exponent value calculation system) from the time series signal. In the SiCECA processing, since the sensitivity with respect to the noise intensity is adjustable, the chaos theoretical exponent value calculation system has a higher reliability to allow the calculation of the intensity of chaoticity by setting the sensitivity to low, as well as the calculation of "a value obtained by adding to a value denoting the chaoticity intensity a value denoting the noise intensity" by setting the sensitivity to high, in addition to the calculation from the above of the intensity of the noise disturbing the chaoticity of the time series signal, and the ratio of chaoticity intensity of the time series signal to the noise intensity.

The invention in accordance with claim 1 provides a chaos theoretical exponent value calculation system, comprising:

a means for reading a time series signal to be subjected to a chaotic analysis; a means for cutting out said read time series signal for each processing unit for calculating a chaos theoretical exponent value with respect to a sampling time; and a means for calculating a chaos theoretical exponent value of said read time series signal, wherein said means for calculating a chaos theoretical exponent value comprises: a first calculation means for calculating a chaos theoretical exponent value with respect to said sampling time as a microscopic chaos theoretical exponent value, in said cut-out time series signal at a processing unit; and a second calculation means for calculating the chaos theoretical exponent value of said time series signal with respect to a predetermined time as a macroscopic chaos theoretical exponent value, based on said microscopic chaos theoretical exponent value.

The invention in accordance with claim 2 provides the chaos theoretical exponent value calculation system, further comprising: a means for receiving, as parameters, an embedding dimension D, an embedding delay time $\tau_d$, an expansion delay time $\tau_e$, a size of neighborhood points set N, and the shortest period $T_m$ and the longest period $T_M$ of said time series signal; wherein said means for cutting out said time series signal for each processing unit cuts out a time series signal for each processing unit $x=x(i)$ from said time series signal based on Equation 2, where, when said read time series signal is $s=s(t)$, $t_0$ and $t_1$ in Equation 2 are given as $t_0$ and $t_1$ satisfying a periodicity condition predetermined by Equation 3.

The invention in accordance with claim 3 provides the chaos theoretical exponent value calculation system, wherein said first calculation means: generates a neighborhood points set $P=\{P_0, P_1, \ldots, P_{(N-1)}\}$ at said sampling time based on Equation 5; sets a SiCECA neighborhood distance $\epsilon_s$ at said sampling time; generates an expansion points set S corresponding to said neighborhood points set P based on Equation 7; defines a displacement vector $y_j$ of a neighborhood point and a displacement vector $z_j$ of a corresponding expansion point by Equation 8 from said neighborhood points set P and said expansion points set S; calculates a matrix $A_0$ which satisfies Equation 9 from said displacement vectors $y_j$ and $z_j$ based on Equation 10; and calculates said microscopic chaos theoretical exponent value $c_m$ by QR decomposition of said matrix $A_0$.

The invention in accordance with claim 4 provides the chaos theoretical exponent value calculation system, wherein said first calculation means: generates a neighborhood points set $P=\{P_0, P_1, \ldots, P_{(N-1)}\}$ at said sampling time based on Equation 5; sets a SiCECA neighborhood distance $\epsilon_s$ at said sampling time; sets said neighborhood points candidate set P to neighborhood points set P from said cut-out processing unit, when said SiCECA neighborhood distance $\epsilon_s$ is smaller than $\epsilon_c$ predetermined for a radius of a strange attractor constructed in an embedding space; generates an expansion points set S corresponding to said neighborhood points set P based on Equation 7; defines a displacement vector $y_j$ of an adjacent point and a corresponding displacement vector $z_j$ of an expansion point from said neighborhood points set P and said expansion points set S based on Equation 8; calculates a matrix $A_0$ satisfying Equation 9 from said displacement vectors $y_j$ and $z_j$ based on Equation 10; and calculates said microscopic chaos theoretical exponent value $c_m$ by QR decomposition of said matrix $A_0$.

The invention in accordance with claim 6 provides the chaos theoretical exponent value calculation system, wherein said second calculation means: generates a set $CEm(t)=\{c_m(t), \epsilon_s(t), T(t)\}$ having as elements a microscopic chaos theoretical exponent value $c_m$ at a sampling time t, said SiCECA neighborhood distance $\epsilon_s$ and said period T in said cut-out processing unit $x(i)$; generates a subset $CEm(t|t_0 \leq t \leq t_1)$ from said generated $CEm(t)$ based on Equation 24; and extracts elements up to $(n \times p)^{th}$ ($0 < p \leq 1$) counted from a smaller side of SiCECA neighborhood distance $\epsilon_s(t)$ in said processing unit $x(i)$ among elements of said subset, and sets the mean value of chaos theoretical exponent values $c_m(i)$ of these elements to said macroscopic chaos theoretical exponent value $c_M$.

The invention in accordance with claim 7 provides the chaos theoretical exponent value calculation system, wherein said second calculation means: generates a subset $CEm$ $(t_0 \leq t \leq t_1)$ based on said Equation 24 from said generated $CEm(t)$, using as a stable time zone a time zone where a period $T(t)$ has a changing rate not more than a predetermined value when compared to a period $T(t)$ of said predetermined time.

The invention in accordance with claim 8 provides the chaos theoretical exponent value calculation system, wherein said second calculation means: generates a set $CEm(t)=\{c_m(t), \epsilon_s(t), T(t)\}$ having as elements a microscopic chaos theoretical exponent value $c_m$ at a sampling time t and said SiCECA neighborhood distance $\epsilon_s$ and said period T in said cut-out processing unit $x(i)$; generates a subset $CEm(t|t_0 \leq t \leq t_1)$ from said generated $CEm(t)$ based on Equation 30; and sets to said macroscopic chaos theoretical exponent value $c_M$ by applying Equation 31 to said generated subset $CEm(t|t_0 \leq t \leq t_1)$.

Each of the present inventions as has been described above allows the section where the signal waveforms (voice signal waveforms and the like) are stable to be locally cut out in a system with temporally changing dynamics (for example, a continuous speech voice signal), which has been difficult in the conventional techniques, thereby to allow the calculation of the chaos theoretical exponent value even in a time series signal with a temporally changing dynamics.

In addition, by using the inventions set forth in claims 6 and 7, a high precision calculation of a chaos theoretical. exponent value can be made. When the invention set forth in claim 8 is used, because it is not needed to sort microscopic chaotic index values in the processing unit for calculating a macroscopic chaos theoretical exponent value, it makes it possible to perform a high speed calculation of a chaos theoretical exponent value.

When the time series signal is a generic continuous speech voice signal, one of big issues in the evaluation and analysis of such a speech voice is how precisely a section where voice signal waveforms are locally stable can be cut out therefrom. These inventions enable a far more stable and faster calculation of chaos theoretical exponent values used to evaluate the chaoticity from the speech voice signal of a few seconds, as compared to the conventional techniques.

From the experiments conducted heretofore, it has been made clear that the chaos theoretical exponent value of a speech voice has a correlation with the degree of fatigue and the stress state of the speaker. The present invention allows the measurement and evaluation of a psychosomatic state such as the degree of fatigue and the stress state of the speaker on a real-time or quasi real-time basis at the time of speaking.

In addition, the system in accordance with the invention described above, which generates the neighborhood points set (or the formal neighborhood points set) from the periodicity condition, is able to generate the neighborhood points set much faster than the conventional methods which generate the neighborhood points set as a set of points satisfying the neighborhood condition from the entire processing units, allowing to significantly shorten the time for calculating the chaos theoretical exponent value when compared with the time for calculating the first Lyapunov exponent by a conventional technique.

For example, when processing the speech voice signals sampled at 44.1 kHz, and when compared with the case of conventional techniques where the processing unit time is set to one second to calculate an average first Lyapunov exponent by a moving average processing with the processing unit starting at each sample, the system in accordance with the present invention calculates the average chaos theoretical exponent value in a shorter time of two decimal orders or more.

In the conventional techniques, the neighborhood points set is generated from the entire processing units as a set for satisfying the neighborhood condition, so that a stable processing result is not always obtained when the dynamics changes within a processing unit. The system in accordance with the present invention, in contrast, which generates the neighborhood points set (or the pro form a formal neighborhood points set) from the periodicity condition, and which also allows the application of the neighborhood condition or the convergent calculation continuity condition in addition to the periodicity condition, makes it possible to calculate the chaos theoretical exponent value when a stable dynamics is present and to obtain temporally local processing result far more stable than ever.

The invention in accordance with claim 5 provides the chaos theoretical exponent value calculation system, wherein said first calculation method further: sets said calculated microscopic chaos theoretical exponent value $c_m$ as a first chaos theoretical exponent value in a cerebral spectrum; and calculates an $n^{th}$ convergent value of said microscopic chaos theoretical exponent value $c_m$ by performing, after calculating said first chaos theoretical exponent value, a convergent calculation while setting a first element of said expansion points set S as a first element of a succeeding neighborhood points set P.

By calculating an $n^{th}$ convergent value as shown above, the calculation of chaos theoretical exponent value with respect to the sampling time is allowed to be performed at a higher precision than the case of one single calculation. The cerebral spectrum is defined as a spectrum of chaos theoretical exponent values calculated by the chaos theoretical exponent value calculation system in accordance with the present invention (i.e., the spectrum of microscopic chaos theoretical exponent values) and corresponds to the relation between the Lyapunov exponent and Lyapunov spectrum in the conventional techniques.

The invention in accordance with claim 9 provides the chaos theoretical exponent value calculation system, wherein said means for reading a time series signal reads a time series signal digitized by an A/D converter.

The invention in accordance with claim 10 provides the chaos theoretical exponent value calculation system, wherein said chaos theoretical exponent value calculation system further comprises: a means for visualizing a chaos theoretical exponent value by smoothing temporal changes of said macroscopic chaos theoretical exponent value and outputting the changes as a graph.

The invention in accordance with claim 11 provides the chaos theoretical exponent value calculation system, wherein said means for visualizing a chaos theoretical exponent value extracts a macroscopic chaos theoretical exponent value by performing a filtering processing based on Equation 29 or Equation 34, and visualizes the temporal changes by showing the changes in a graph.

The calculated chaos theoretical exponent values can be visualized to be displayed by the inventions in accordance with claims 10 and 11. This allows not only to calculate and to output as numerical data, but also to visualize so as to facilitate the understanding of a decision maker using the chaos theoretical exponent value. In particular, the foregoing allows the visualization of chaos theoretical exponent values at a temporally higher resolution, thereby ultimately improving the precision.

The invention in accordance with claim 12 provides the chaos theoretical exponent value calculation system: wherein said time series signal is a continuous speech voice signal; and wherein said predetermined time at a time of calculation of said macroscopic chaos theoretical exponent value is a duration of a phoneme.

It is effective to process the speech voice signal for the processing using the time series signal by the system in accordance with the present invention. In the conventional techniques, the first Lyapunov exponent has been calculatable only when the clear voice signal by a single speaker can be exclusively processed. The present invention allows the chaos theoretical exponent value to be calculated on a real-time or quasi real-time basis, which was previously impossible in practice, for example allowing the result to be displayed on a computer display if the time series signal is a speech voice signal.

The chaos theoretical exponent value to be calculated by the chaos theoretical exponent value calculation system as mentioned above in accordance with the present invention, in relation to the size of hypersphere and the Lyapunov exponent calculated formally, is the value having the meaning as shown in FIG. 7.

When a brain is actively functioning, the speech voice includes many crosstalk noises, namely many disturbances of signals derived from other part, and the relationship between the SiCECA neighborhood distance and the chaos theoretical exponent value calculated is on the curve of FIG. 7, indicating "the relationship between the chaos theoretical exponent value and the SiCECA neighborhood distance when the cerebral activity is high", and the chaos theoretical exponent value when the SiCECA neighborhood distance parameter p is 10% is given by the intersection between the relational curve and the vertical line giving CEM10.

It can be seen from FIG. 7 that the sensitivity increases when the SiCECA neighborhood distance parameter is set to 10%, while the cerebral evaluation sensitivity decreases when 30%. At 100%, the sensitivity for detecting any stress and the like affecting the speech contents cannot be obtained.

Since the dynamics that generates actual speech voices does not have ideal noise characteristics as shown in FIG. 7, the SiCECA neighborhood distance parameter for obtaining a stable processing result must be set in correspondence with the degree of clarity of signals to be processed, and it is better to set to 20% for the purpose of analyzing voices in an ordinary office environment.

BRIEF DESCRIPTION OF DRAWINGS

FIG. 12 is a conceptual diagram showing the relationship between the microscopic chaos theoretical exponent value and macroscopic chaos theoretical exponent value.

BEST MODE FOR CARRYING OUT THE INVENTION

Figure 10:
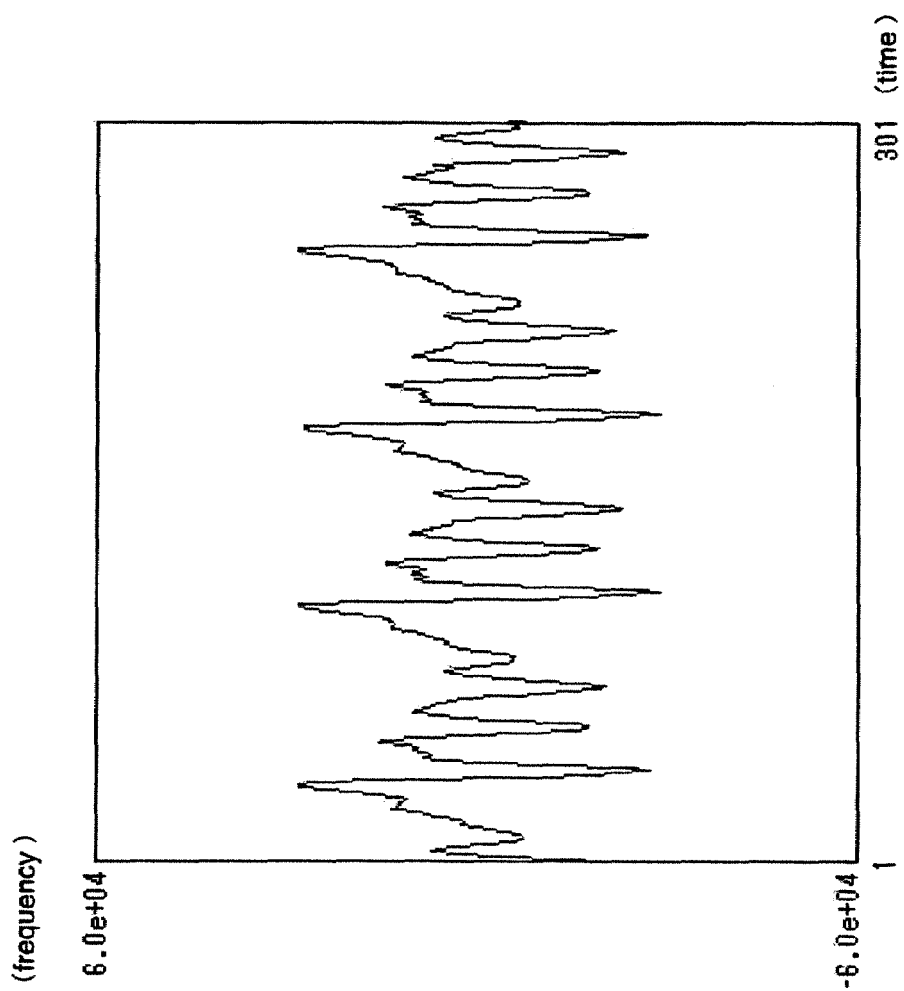
FIG. 10 is a diagram showing the waveform of the phoneme /a/.
Figure 11:
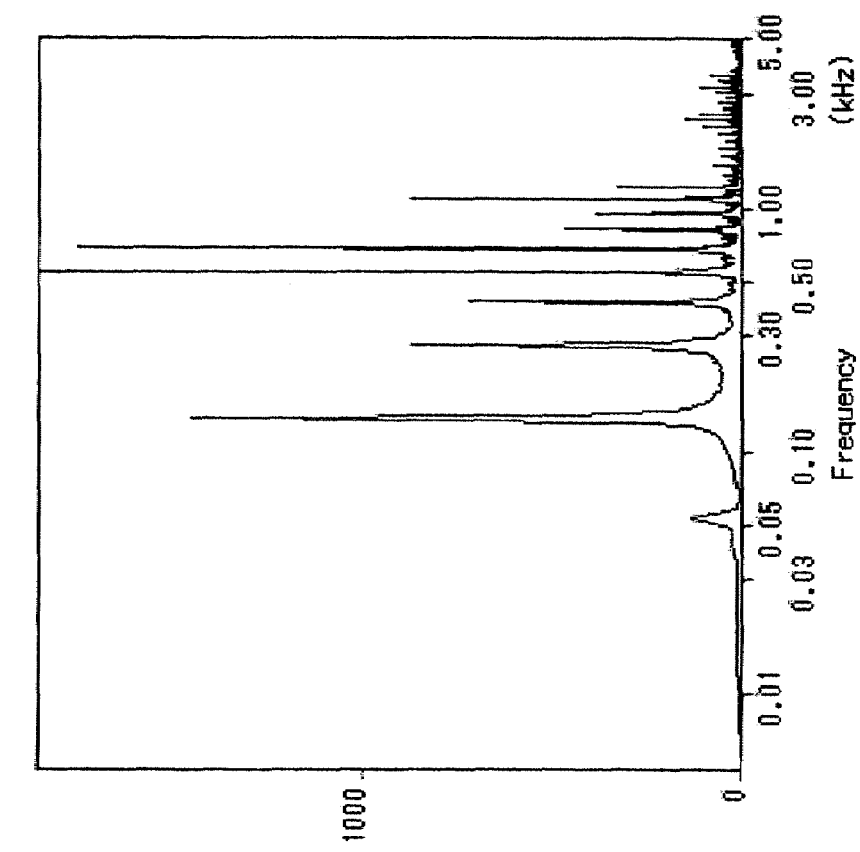
FIG. 11 is a diagram showing the spectrum of the phoneme /a/.

The present invention will be described in greater details with reference to flowcharts shown in FIGS. 1 to 4. Although in the description which follows, an exemplary case will be described in which a continuous speech voice signal is given as a system with a temporally changing dynamics, which signal is chaos theoretically analyzed to calculate a chaos theoretical exponent value, the analysis of any time series signal other than the continuous speech voice signal is achievable in a similar manner provided that the signal has a periodic property (a periodic property means a property that allows distinct peaks to be observed on the frequency domain by a spectrum analysis. FIG. 10 shows the waveform of the phoneme /a/, and FIG. 11 shows the spectrum of the phoneme /a/). This is clear in the processing of chaos theoretical exponent value calculation system as described herein below from the fact that it does not rely on any specific processing of a continuous speech voice signal. In the description of the chaos theoretical exponent value calculation system (SiCECA) in accordance with the present invention, it is appreciated by those skilled in the art how to use a memory, processor, storage means, etc., included in a computer in an ordinary fashion to calculate variables and equations in the computer to express the procedure in an arbitrary programming language or a machine language and the like in order to execute on the computer. For instance, variables and equations may be structured in arrays, and pointers and the like and may be expressed additionally using a branch processing, a repetition processing, a reentrant processing and the like.

The evaluation of a time series signal by the chaos theoretical exponent value can be visualized by calculating the exponent value by the two succeeding procedures described later, and performing a processing for plotting in a graph the temporally moving average thereof.

In the time series signals obtained by sampling a speech voice, a chaos theoretical exponent value of the time series signal for each sampling time (this is referred to as a microscopic chaos theoretical exponent value) is calculated (S200). The calculation may be done either for all of sampling times, or for every other sampling time, or for every $10^{th}$ time.

For the sampling frequency of 44.1 kHz of time series signal to be processed, for example, the microscopic chaos theoretical exponent values are calculated at the interval of 0.0227 ms (=1/44.1).

Then the chaos theoretical exponent value of the time series signal for a predetermined period of time including the sampling time of the microscopic chaos theoretical exponent value (referred to as a macroscopic chaos theoretical exponent value), for example the duration of the phoneme pronounced, is calculated (S400).

For an ordinary speech voice, since the duration of one single phoneme is from tens milliseconds to one hundred and tens milliseconds, one macroscopic chaos theoretical exponent value is one value calculated from hundreds to thousands microscopic chaos theoretical exponent values calculated during that time, or a plurality of values in the order of several values depending on the processing parameter settings for the calculation of a macroscopic chaos theoretical exponent value.

It is possible to obtain an exponent value showing changes over time of the cerebral activity and being visually understandable from a graph by setting an average processing interval of about 30 seconds to perform a temporal moving averaging, for the macroscopic chaos theoretical exponent value (S500).

The temporal moving average processing with respect to the macroscopic chaos theoretical exponent value as mentioned above may be also substituted with a process using another processing procedure by defining a definitively corresponding relation between the macroscopic chaos theoretical exponent value and the speech contents, the individual phrase or the phoneme.

The microscopic chaos theoretical exponent value as mentioned above means a chaos theoretical exponent value of a time series signal with respect to each sampling time, and the macroscopic chaos theoretical exponent value means a chaos theoretical exponent value with respect to a predetermined interval, such as the duration of a phoneme, based on the microscopic chaos theoretical exponent values. FIG. 12 shows a conceptual diagram showing the relationship between the microscopic chaos theoretical exponent value and the macroscopic chaos theoretical exponent value.

The chaos theoretical exponent value calculation system in accordance with the present invention is a system for implementing such processes at a computer terminal, which makes it possible to provide microscopic chaos theoretical exponent values for a system of a variable dynamics, which has not been defined by any conventional system or to quantify the noise level of a noise that disturbs the chaoticity when convoluted on the chaos theoretical time series signal, although the quantification of the noise did not have any special meaning in the conventional methods.

Accordingly, when constructing a system for observing any change in the cerebral activity of a speaker form his/her speech voice in accordance with the present invention, it is preferable to provide a process for calculating temporal moving average exponents or an alternative process which makes it easier to visually observe any change in the cerebral activity.

As have been described above, SiCECA is a system which makes it possible to calculate the chaos theoretical exponent values at a high speed.

In the following description, the microscopic chaotic index value is represented by a micro-chaos theoretical exponent value $c_m$ ($=c_{micro}$), and the macroscopic chaos theoretical exponent value is represented by a macro-chaos theoretical exponent value $c_M$ ($=c_{MACRO}$)

First, the process (S200) for calculating the microscopic chaos theoretical exponent value will be described. To calculate the micro-chaos theoretical exponent value $c_m$ by SiCECA, an embedding dimension D, an embedding delay time $\tau_d$, an expansion delay time $\tau_e$, a size of neighborhood points set N are defined as chaos theoretical processing parameters, and the shortest period $T_m$ and the longest period $T_M$ of the time series signal are defined as the parameters of period settings in SiCECA (S110).

These parameters, an embedding delay time $\tau_d$, an expansion delay time $\tau_e$, the shortest period $T_m$ and the longest period $T_M$, will be defined using the sampling interval $\Delta t$ of the time series signal as a unit time for the sake of simplicity in the following description, hence $\tau_d$, $\tau_e$, $T_m$, and $T_M$ are used as dimensionless numbers for representing the number of sampling intervals.

When the embedding delay time $\tau_d$, the expansion delay time $\tau_e$, the shortest period $T_m$ and the longest period $T_M$ require their time dimensions, these parameters are explicitly defined as $\tau_d \times \Delta t$, $\tau_e \times \Delta t$, $T_m \times \Delta t$, and $T_M \times \Delta t$, respectively.

The size of neighborhood points set N is required to be (D+1) or more of the embedding dimension D. In order to stably conduct the following calculation without for example, zero-divide, it is preferable to set (D+2), (D+3) and more, however it is better not to increase it more than required, to decrease the amount of calculations for the micro-chaos theoretical exponent values $c_m$.

When the dynamics continuously varies such as in a speech voice, the size of neighborhood points set N is preferably set as small as a stable calculation is possible in order to prevent the intermixing of points of different dynamics into the neighborhood points set or its candidate, from the point of view of improving the reliability of the micro-chaos theoretical exponent values. For example, the appropriate size of neighborhood points set is 6 or 7 if the embedding dimension is 4.

Even when N is set to (D+1), the use of a dithering processing allows the prevention of the occurrence of zero-divide. For the size of neighborhood points set N, it is therefore important to set in accordance with the property of the signal to be processed in view of the improved processing efficiency and the securing of reliability of the processing result.

Figure 3:
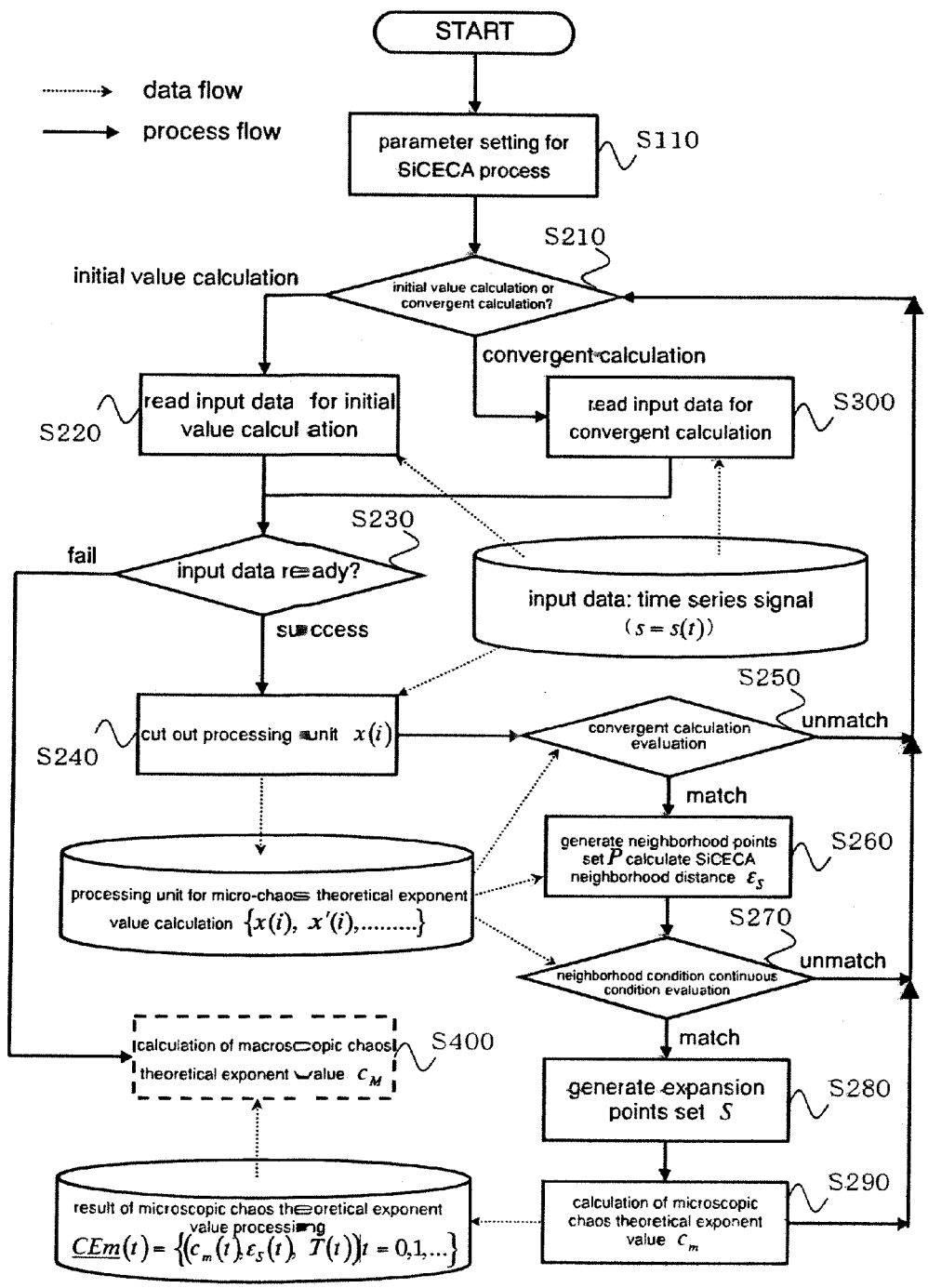
FIG. 3 is a flowchart showing an exemplary correspondence between the calculation processing of the microscopic chaos theoretical exponent value and the data in the inventive process.

After setting at S110, because it is a calculation of the initial values at S210 of FIG. 3, a time series signal used as input data for initial value calculation is read (S220). Here the time series signal s=s(t), such as a continuous speech voice to be processed by SiCECA, is defined as Equation 1.

$$s(t)=\{s_t|t=0,1,\ldots\} \qquad \text{Equation 1}$$

$s_t$ is the individual data constituting the time series signal and being generated by sampling of a voice signal and the like by for example an A/D converter, and t provides the time quantified by the sampling interval $\Delta t$ (when frequency of sampling clock is $f_s$, then $f_s \times \Delta t=1$).

If at S220 the time series signals is successfully read (S230), a processing unit of the time series signal x=x(i) is cut out from the time series signal s(t) of Equation 1 to calculate the micro-chaos theoretical exponent value $c_m$ (S240) as Equation 2:

$$x(i)=\{x_i|i=0,1,\ldots,n_0\}$$

$$n_0=(N-1)\times T_M+(D-1)\tau_d+\tau_e$$

$$x(0)=x_0=s(t_0), x(1)=x_1=s(t_0+1), \ldots,$$

$$x(n_0)=x_{n_0}=s(t_0+n_0)=s(t_1) \qquad \text{Equation 2}$$

where $t_0$ is set in such a way that x(i) satisfies a periodicity condition in SiCECA.

In the time series signals x=x(i) cut out as above, at the time of generating the neighborhood points candidate set P and the expansion points set P as described later, the element of $D^{th}$ dimension of the point latest in the time in the expansion points set S when the periodicity condition of the time series signals x=x(i) is satisfied in the longest period $T_M$, is given by $x(n_0)$.

When the periodicity condition of a time series signal is given by the shortest period $T_m$ and the longest period $T_M$, the time series signals x=x(i) cut out for generating the neighborhood points candidate set P must satisfy Equation 2.

$t_0$ which satisfies the periodicity condition in Equation 2 is evaluated (determined) by incrementing to starting with 0 for s(t) defined in Equation 1 and by confirming whether it satisfies the periodicity condition predetermined by Equation 3 (S250). It is naturally possible to set as defined by Equation 3 the time series signals $x^{\wedge}=x^{\wedge}(i)$ (where $x^{\wedge}(i)=\{x_i|i=0, 1, \ldots, n_1\}$) cut out for the calculation of micro-chaos theoretical exponent values with respect to the time series signals x=x(i), where $n_0 \leq n_1$, so as to include x=x(i), however if the periodicity condition applied thereto is given by the shortest period $T_m$ and the longest period $T_M$, the data added to Equation 2 does not have any meaning. It is also meaningless to cut out after adding data preceding in time wise to its first element x(0) to partial time series signals given by Equation 2, as long as the first element of the origin of neighborhood points candidate set is x(0).

$$s_{[t_0, t_1]}(t)=\{s_t|t=t_0, t_0+1, \ldots, t_1-1, t_1\}$$

$$t_1-t_0+1=(N-1)\times T_M+(D-1)\tau_d+\tau_e \qquad \text{Equation 3}$$

The evaluation of the periodicity condition for the calculation of the first neighborhood points candidate set in SiCECA with respect to s(t) defined in Equation 3 is performed on the data sampled in the interval from $t_0=0$ to $t_1=(N-1)\times T_M+(D-1)\tau_d+\tau_e-1$, i.e., to the data between $s(t_0)$ to $s(t_1)$.

When the time series signals cut out as shown in Equation 3 above satisfy the predetermined periodicity condition, then the generation of an neighborhood points set candidate from the cut-out time series signals is possible, and if the neighborhood points candidate set satisfies other neighborhood points set condition such as dynamic range, by using it as the neighborhood points set, the micro-chaos theoretical exponent value $c_m(0)$ at the time $t=0$ can be calculated.

In case where the condition that defines an neighborhood points candidate set as an neighborhood points set is only the periodicity condition, if the time series signal to be cut out as mentioned above satisfies the periodicity condition, then it is possible to generate the neighborhood points set directly from the time series signal and to calculate the micro-chaos theoretical exponent value $c_m(0)$ at the time $t=0$.

In SiCECA, the periodicity condition is an essential condition in the generation processing of an neighborhood points set from the cut-out time series signals, and the essential condition is the periodicity condition only.

As for the condition for evaluating the neighborhood points candidate set to define an neighborhood points set, it is possible to use, in addition to the essential periodicity condition as mentioned above, a combination of various filtering conditions corresponding to such as the input signal intensity and the clarity of the input signal, and the condition can be determined in accordance with the demand of processing speed or precision to the processing at the computer terminal.

The verification of the periodicity condition in Equation 3 above is performed by verifying whether $s_{[t0, t1]}(t)$ satisfies $T_m \leq t \leq T_M$, by means of any suitable frequency analysis techniques including Fourier transform such as discrete Fourier transform (DFT) or fast Fourier transform (FFT), or a frequency analysis such as a linear prediction analysis (LPC), or wavelet analysis.

In the evaluation of the periodicity condition of the partial time series signal $x=x(i)$ cut out from the time series signals $s=s(t)$ to be processed by SiCECA and for calculating the micro-chaos theoretical exponent value $c_m(t)$ of each sampling time, the entire set of partial time series signals $x=x(i)$ necessary for generating an neighborhood points set is not always required strictly if the periodicity defined by Equations 2 and 3 is equal to the longest period $T_M$, and the evaluation can be performed on the periodicity condition by adding to the partial time series signal some preceding and succeeding data.

This implies that the data size subjected to an examination by applying a fast processing such as FFT may be adjustable with respect to the partial time series signal $x=x(i)$ at the time of periodicity condition evaluation, however this does not permit the case where the data size used for the examination (verification) of the periodicity condition is a fraction or a several fold of the data size of the partial time series signals $x=x(i)$.

For adjusting the data size to be used in the evaluation of the periodicity condition with respect to the data size of the partial time series signals $x=x(i)$, in order to maintain a practical precision, the appropriate range of data size used in the evaluation of the periodicity condition is from 80% to 120% of the data size of the partial time series signals $x=x(i)$, in accordance with experimental results.

In the evaluation of the periodicity condition of the processing unit $x(i)$ described above, data preceding or succeeding to that processing unit $x(i)$ can be added thereto, in accordance with the size of the processing unit or the evaluation method of the periodicity condition, in order to apply a fast signal processing method such as FFT (Fast Fourier Transform).

Although $x(i)$ in Equation 2 above is considered as a processing unit for calculating the micro-chaos theoretical exponent value $c_m$, the calculation of the micro-chaos theoretical exponent value $c_m$ does not always require the entire data of $s_{[t0, t1]}(t)$ since the period $T$ of $s_{[t0, t1]}(t)$ satisfies $T \leq T_M$, and $x(i)$ has a meaning different from the processing unit required to be set strictly in such a system as known Sano/Sawada's algorithm, since the period $T$ of $s_{[t0, t1]}(t)$, calculated in the evaluation of periodicity condition in SiCECA, is subject to a variation.

$x(i)$ can be cut out by applying the periodicity condition in SiCECA to the sampled voice signal which is continuously sampled, for example, and sampling index $i$ provides a time based on the sampling interval.

To describe the process of cutting out the processing unit $x(i)$ from the time series signal $s=s(t)$ as described above, the time series signal $s=s(t)$ is first captured as the time series signals sampled at constant intervals, and the discrete Fourier transform (DFT) or the linear prediction analysis (LPC) is applied thereto. The local frequency spectrum obtained therefrom is used for predicting the period of the strange attractor generated when the time series signals are embedded in an embedding space. By doing this, the time series signal $s=s(t)$ and the data denoting the temporal change of its frequency, namely the period of the strange attractor, can be obtained. Thus obtained data is used to form a time series signal, which is derived from the sampled time series signals, and in which the digital voice information is related to the frequency information or the period of the strange attractor. Thereafter, a search is made on the frequency information or the periodicity information of the strange attractor so as to cut out the data that provides the periodicity as the processing unit $x(i)$ if there is a predetermined periodicity. The wavelet transform and the like can be used for the calculation of the prediction or evaluation of the strange attractor stability.

In the following description, $x(i)$ is referred to as a processing unit for calculating the micro-chaos theoretical exponent value $c_m$ by applying SiCECA.

In S240 and S250, only the periodicity condition is used for cutting out the processing unit $x(i)$ from the time series signal $s(t)$. Depending on the processing purpose or the signal property subjected to a processing, any other cut-out condition such as the dynamic range of the processing unit $x(i)$ can be added thereto, and it is possible to improve the signal processing efficiency by not performing any unnecessary processing on the mute section in the speech voice signal.

From above, if the neighborhood points set of processing unit $x(i)$ or its candidate set is defined as Equation 4, then the neighborhood points set or its candidate set can be defined by Equation 5 (S260).

$$P = \{P_0, P_1, \ldots, P_{(N-1)}\} \quad \text{Equation 4}$$

$$P_0 = (x_0, x_{\tau_d}, x_{2\tau_d}, \ldots, x_{(D-1)\tau_d})$$

$$P_1 = (x_T, x_{\tau_d+T}, x_{2\tau_d+T}, \ldots, x_{(D-1)\tau_d+T})$$

$$\ldots$$

$$P_{(N-1)} = (x_{(N-1)T}, x_{\tau_d+(N-1)T}, x_{2\tau_d+(N-1)T}, \ldots, x_{(D-1)\tau_d+(N-1)T}) \quad \text{Equation 5}$$

In the above neighborhood points candidate set P, the origin in a candidate of the neighborhood points set, more specifically the first data $x_0$ of the time series signal for processing the reference point $P_0$ is the first element.

If the radius of a hypersphere including the above neighborhood points set in the embedding dimensional space is the SiCECA neighborhood distance $\epsilon_s$ for the above neighborhood points candidate set P, the SiCECA neighborhood distance $\epsilon_s$ is given by Equation 6.

$$\epsilon_s = \max\{\overline{P_0P_1}, \overline{P_0P_2}, \ldots, \overline{P_0P_{(N-1)}}\} \quad \text{Equation 6}$$

It is to be noted here that the SiCECA neighborhood distance $\epsilon_s$ as mentioned above is the radius of a hypersphere having a sufficient scale for including the neighborhood points candidate set as mentioned above, and does not provide the radius of the first hypersphere that includes the neighborhood points candidate set as mentioned above.

The SiCECA neighborhood distance $\epsilon_s$ is a neighborhood condition required for the calculation of the micro-chaos theoretical exponent value $c_m$ and a parameter required for setting the convergent calculation continuity condition, and at the same time, it is required for the calculation of a macro-chaos theoretical exponent value $c_M$ from the micro-chaos theoretical exponent value $c_m$ thus is a value serving a constitutionally important role in SiCECA. However since it is relatively set with respect to the size of the strange attractor generated by the time series signal to be processed, the definition in accordance with Equation 6 is not always necessary, and the definition as the radius of the smallest hypersphere which includes the neighborhood points candidate set mentioned above has no problem. More specifically, in case of the SiCECA neighborhood distance $\epsilon_s$, it is possible to set any given value (this value can be set arbitrarily as a predetermined value) as its predetermined value, however an efficient calculation is made possible by setting $\epsilon_s$ as above.

If the SiCECA neighborhood distance $\epsilon_s$ is defined as the radius of the smallest hypercube that includes the neighborhood points candidate set mentioned above, in case where the macro-chaos theoretical exponent value $c_M$ is calculated from the micro-chaos theoretical exponent value $c_m$, the macro-chaos theoretical exponent value $c_M$ can be calculated at a higher precision.

In the calculation of micro-chaos theoretical exponent value $c_m$, when the neighborhood condition is defined as $\epsilon_s \ll \epsilon_c$ (where $\epsilon_c$ is given by multiplying the radius of strange attractor constituted in the embedding space from the processing unit with a predetermined value, namely in the usual processing in SiCECA, approximately 0.5), if $\epsilon_s$ satisfies this condition then the above neighborhood points candidate set becomes an neighborhood points set, however if not then the candidate is rejected as for an neighborhood points set (S270).

When the above neighborhood points candidate set is rejected as for an neighborhood points set, then the periodicity condition in SiCECA is applied to the time series signal s(t) subjected to a processing such as a speech voice signal, a new processing unit x(i') having its origin at a point later in the sequence of a time series than the preceding processing unit is cut out, another neighborhood points candidate set in this new processing unit x(i') is generated, the neighborhood condition is similarly applied, and an neighborhood points set which satisfies the condition is searched.

When above $\epsilon_s$ satisfies the neighborhood condition, then the expansion delay time $\tau_e$ is applied to P which became the neighborhood points set, and an expansion points set S as given by Equation 7 is generated (S280).

$$S = \{S_0, S_1, \ldots, S_{(N-1)}\}$$

$$S_0 = (x_{0+\tau_e}, x_{\tau_d+\tau_e}, x_{2\tau_d+\tau_e}, \ldots, x_{(D-1)\tau_d+\tau_e})$$

$$S_1 = (x_{\tau_e+T}, x_{\tau_d+\tau_e+T}, x_{2\tau_d+\tau_e+T}, \ldots, x_{(D-1)\tau_d+\tau_e+T})$$

$$\ldots$$

$$S_{(N-1)} = (x_{\tau_e+(N-1)T}, x_{\tau_d+\tau_e+(N-1)T}, x_{2\tau_d+\tau_e+(N-1)T}, \ldots, x_{(D-1)\tau_d+\tau_e+(N-1)T}) \quad \text{Equation 7}$$

Note that $S_0$ above is an expansion point of $P_0$, and $S0, \ldots, S_{(N-1)}$ are expansion points corresponding to $P_1 \ldots, P_{(N-1)}$, respectively.

When the neighborhood points set P and the corresponding expansion points set S are obtained as stated above, the displacement vector $y_j$ of the adjacent point and the corresponding displacement vector $z_j$ of the expansion point are defined by Equation 8.

$$\vec{y}_j = \overrightarrow{P_0P_j} = (x_{jT} - x_0, x_{\tau_d+jT} - x_{\tau_d}, \ldots, x_{(D-1)\tau_d+jT} - x_{(D-1)\tau_d})$$

$$\vec{z}_j = \overrightarrow{S_0S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$$

$$j = 1, 2, \ldots, N-1 \quad \text{Equation 8}$$

If a matrix $A_0$ satisfying Equation 9 is obtained in the relationship between above vectors $y_j$ and $z_j$, then the cerebral spectrum in SiCECA is calculated similarly as if the Lyapunov spectrum is predicted in a system of Sano/Sawada's algorithm (in strict speaking, in the system of Sano/Sawada's algorithm, the initial value for Lyapunov spectrum prediction is predicted).

$$\vec{z}_j = A_0 \vec{y}_j, \ j = 1, 2, \ldots, N-1 \quad \text{Equation 9}$$

Above equations 8 and 9 describe the processing used for predicting Lyapunov spectrum in the signal processing of a time series signal such as a human speech voice signal, which provides an estimated Jacobian matrix $A_0$, which gives Lyapunov exponents as the expansion of micro-displacement vector $y_j$ (expansion displacement is vector $z_j$) in the attractor constituted in a phase space (in general referred to as a time delay coordinate system) when the neighborhood points candidate set P is defined by equations 4 and 5 and the expansion points set S is defined by equation 7.

To calculate the cerebral spectrum, the matrix $A_0$ is calculated so as to satisfy Equation 10:

$$S_0 = \sum_{j=1}^{N-1} |\vec{z}_j - A_0 \vec{y}_j|^2 \quad \text{Equation 10}$$

$$\frac{\partial S_0}{\partial a_0^{kl}} = 0$$

where $a_0^{kl}$ is the element (k,l) of $A_0$.

If the matrix $A_0$ is in D dimension, D sets or more of the independent micro-displacement vector $y_j$ and the expansion displacement $z_j$, which are not in linear relation, for the calculation of matrix $A_0$ as stated above. When there are given D sets of the micro-displacement vector $y_j$ and the expansion displacement $z_j$, $S_0$ in Equation 10 provides a square sum of errors in the relation between the micro-displacement vector $y_j$ and the expansion displacement $z_j$ when the matrix $A_0$ is given. Accordingly the partial differential of $S_0$ in Equation 10 means the minimum square sum of errors in the relation between the micro-displacement vector $y_j$ and the expansion displacement $z_j$.

Specifically, Equation 10 describes that the matrix $A_0$ is estimated by the least square method.

The calculation of above Equation 10 gives Equation 11, then the matrix $A_0$ can be derived from Equation 11.

$$A_0 = C_0 V_0^{-1} \quad \text{Equation 11}$$

$$(V_0)^{kl} \equiv \frac{1}{N-1} \sum_{j=1}^{N-1} y_j^k y_j^l$$

$$(C_0)^{kl} \equiv \frac{1}{N-1} \sum_{j=1}^{N-1} z_j^k y_j^l$$

By QR decomposition by Equation 12 of the matrix $A_0$ given by Equation 11, the micro-chaos theoretical exponent value $c_m$ for the time at which the first data $x_0$ of the time series signal is given can be calculated as the maximum value of diagonal elements of the matrix $R_0$ (S290).

$$A_0 = Q_0 R_0 \qquad \text{Equation 12}$$

By sorting the diagonal elements of matrix $R_0$ in descending order to thereby call them the first micro-chaos theoretical exponent value, the second micro-chaos theoretical exponent value and so on, a cerebral spectrum having the same number of elements as the number of embedding dimensions is obtained. In the present invention, the micro-chaos theoretical exponent value means the first micro-chaos theoretical exponent value, unless otherwise specified that it is different from the first micro-chaos theoretical exponent value.

The micro-chaos theoretical exponent value $c_m$ is the first micro-chaos theoretical exponent value in the cerebral spectrum.

In the calculation of the micro-chaos theoretical exponent value $c_m$, following convergent calculation is performed to improve the temporal local reliability, similarly to the case where the Lyapunov spectrum is calculated in the system of Sano/Sawada's algorithm, by taking the first element of the preceding expansion points set as the first element of the succeeding neighborhood points set (in other words, the process proceeds back to step S210 to perform the convergent calculation).

In implementing the convergent calculation, new x'(i) should be cut out like Equation 13 with respect to Equation 1, in S240, similarly to the case where a processing unit x(i) is cut out from the time series signal s(t) in S220 to generate an initial neighborhood points set (S300).

$$x'(i) = \{x'_i | i = n_1, 1+n_1, \ldots, n_0+n_1\}$$

$$n_1 = \tau_e,$$

$$x'(n_1) = s(t_0 + \tau_e),\ x'(1+n_1) = s(t_0 + 1 + \tau_e),\ \ldots$$

$$\ldots,\ x'(n_0 + n_1) = s(t_0 \tau_e + n_0) = s(t_1 + \tau_e)$$

$$s_{[(t_0+\tau_e),(t_1+\tau_e)]}(t) = \{s_t | t = t_0 + \tau_e, t_0 + \tau_e + 1, \ldots, t_1 + \tau_e - 1, t_1 + \tau_e\} \qquad \text{Equation 13}$$

Now next processing unit x'(i) should be set after verifying that $s_{[t0+\tau e,\ t1+\tau e]}(t)$ satisfies the predetermined periodicity condition, then applying any additional conditions such as dynamic range and the like, if set any, in a similar way as these are applied to the initial processing unit x(i), and verifying that all of these conditions are met.

As for whether the convergent calculation of the micro-chaos theoretical exponent value $c_m$ should be continued or not, the calculation is repeated either until the processing unit for the next calculation that has as its origin the first element of expansion points set fails to satisfy the periodicity condition or the additional signal processing condition for cutting out the processing unit, or until the processing unit provides no more neighborhood points set satisfying the neighborhood condition or the convergent calculation continuity condition.

The convergent calculation continuity condition are set in such a way that the SiCECA neighborhood distance $\epsilon_s(n)$ of the neighborhood points set P(n) in the $n^{th}$ convergent calculation is not more than the SiCECA neighborhood distance $\epsilon_s(n-1)$ of the neighborhood points set P(n-1) in the $(n-1)^{th}$ convergent calculation, or not more than $\epsilon_s(n-1) \times a$ (here a is a predetermined value, which is $a \leq 1.1$ in the ordinary speech voice processing).

Now assume that the $n^{th}$ convergent calculation takes the first element of the neighborhood points set that supposes the $n^{th}$ convergent calculation from the first element of the expansion points set in the $(n-1)^{th}$ convergent calculation, and that this neighborhood points set P(n) is given by Equation 14.

$$P_0(n) = (x_n, x_{n+\tau_d}, x_{n+2\tau_d}, \ldots, x_{n+(D-1)\tau_d})$$

$$P_1(n) = (x_{n+T}, x_{n+\tau_d+T}, x_{n+2\tau_d+T}, \ldots, x_{n+(D-1)\tau_d+T})$$

$$\ldots$$

$$P_{(N-1)}(n) = (x_{n+(N-1)T}, x_{n+\tau_d+(N-1)T}, x_{n+2\tau_d+(N-1)T}, \ldots,$$
$$x_{n+(D-1)\tau_d+(N-1)T}) \qquad \text{Equation 14}$$

When the neighborhood points set P(n) satisfies the neighborhood condition and convergent calculation continuity condition, then the expansion points set S(n) corresponding to this can be given by Equation 15.

$$S_0(n) = (x_{n+\tau_e}, x_{n+\tau_d+\tau_e}, x_{n+2\tau_d+\tau_e}, \ldots, x_{n+(D-1)\tau_d+\tau_e})$$

$$S_1(n) = (x_{n+\tau_e+T}, x_{n+\tau_d+\tau_e+T}, x_{n+2\tau_d+\tau_e+T}, \ldots,$$
$$x_{n+(D-1)\tau_d+\tau_e+T})$$

$$\ldots$$

$$S_{(N-1)}(n) = (x_{n+\tau_e+(N-1)T}, x_{n+\tau_d+\tau_e+(N-1)T},$$
$$x_{n+2\tau_d+\tau_e+(N-1)T}, \ldots, x_{n+(D-1)\tau_d+\tau_e+(N-1)T}) \qquad \text{Equation 15}$$

Thereafter, similarly to S280 and subsequent thereof, the displacement vector $y_j(n)$ of the neighborhood point and displacement vector $z_j(n)$ of the corresponding expansion point of the neighborhood points set P(n) and the expansion points set S(n) are defined as given by Equation 16.

$$\vec{y}_j(n) = \overrightarrow{P_0(n)P_j(n)} = (x_{n+jT} - x_n, x_{n+\tau_d+jT} - x_{n+\tau_d}, \ldots,$$
$$x_{n+(D-1)\tau_d+jT} - x_{n+(D-1)\tau_d}),$$

$$\vec{z}_j(n) = \overrightarrow{S_0(n)S_j(n)} = (x_{n+\tau_e+jT} - x_{n+\tau_e}, x_{n+\tau_d+\tau_e+jT} -$$
$$x_{n+\tau_d+\tau_e}, \ldots, x_{n+(D-1)\tau_d+\tau_e+jT} - x_{n+(D-1)\tau_d+\tau_e})$$

$$j = 1, 2, \ldots, N-1 \qquad \text{Equation 16}$$

In the relationship between the above vector $y_j(n)$ and vector $z_j(n)$, if a matrix $A_n$ satisfying Equation 17 can be obtained, then the convergent calculation of the cerebral spectrum calculation can be conducted similarly to the convergent calculation used in Lyapunov spectrum estimation in the system using Sano/Sawada's algorithm.

$$\vec{z}_j(n) = A_n \vec{y}_j(n), j = 1, 2, \ldots N-1 \qquad \text{Equation 17}$$

For the calculation of the cerebral spectrum, the matrix $A_n$ is calculated in such a way that Equation 18 is satisfied.

$$S_0 = \sum_{j=1}^{N-1} |\vec{z}_j(n) - A_n \vec{y}_j(n)|^2 \qquad \text{Equation 18}$$

$$\frac{\partial S_n}{\partial a_n^{kl}} = 0$$

where $a_n^{kl}$ is the element (k,l) of $A_n$.

The matrix $A_n$ is given by Equation 19.

$$A_n = C_n V_n^{-1} \qquad \text{Equation 19}$$

$$(V_n)^{kl} \equiv \frac{1}{N-1} \sum_{j=1}^{N-1} y_j(n)^k y_j(n)^l$$

$$(C_0)^{kl} \equiv \frac{1}{N-1} \sum_{j=1}^{N-1} z_j(n)^k y_j(n)^l$$

If n iterations of convergent calculations are possible, then the cerebral spectrum c={$c_s$|s=1, 2, . . . , D} can be given by Equation 20, with the time expansion matrix being M.

$$M = \prod_{k=0}^{n} A_k$$
$$= A_n A_{n-1} A_{n-2} \ldots A_1 A_0$$
$$= A_n A_{n-1} A_{n-2} \ldots A_2 Q_1 R_1 R_0$$
$$= Q_n R_n R_{n-1} R_{n-2} \ldots R_1 R_0$$

$$c_s = \frac{1}{(n+1)(N-1)} \sum_{k=0}^{n} \log|R_k^s|$$

Equation 20 where $R_k^s$ means the $s^{th}$ element of the diagonal elements of matrix $R_k$ counted in a descending order.

Micro-chaos theoretical exponent value $c_m(t_0)$ is given as a matrix $A_0$, from the relationship between the neighborhood points set having time $t_0$ as the origin first dimension element, and the expansion points set having time $t_1$ as the first dimension element for that origin. When the convergent calculation continuity condition is satisfied, then the first convergent calculation can be successively conducted, and from the relationship between the neighborhood points set having time $t_1$ as stated above as the origin first dimension element and the expansion points set having time $t_2$ as the first dimension element for that origin, the micro-chaos theoretical exponent value $c_m(t_1)$ for the time $t_1$ is given as a matrix $A_1$.

At time $t_1$ that expands from time $t_0$, if the convergent calculation continuity condition is satisfied and the micro-chaos theoretical exponent value $c_m(t_1)$ for time $t_1$ is calculated, then by using this a more accurate micro-chaos theoretical exponent value $c_m(t_0)$ at time $t_0$ can be given similarly to the convergent calculation of Lyapunov spectrum in the processing using Sano/Sawada's algorithm, from Equation 35.

$$M = A_1 A_0 = A_1 Q_0 R_0 = Q_1 R_1 R_0$$
$$c_s = \frac{1}{2(N-1)}(\log|R_0^s| + \log|R_1^s|)$$

Equation 35 where $R_k^s$ means the $s^{th}$ element of the diagonal elements of the matrix $R_k$ counted in a descending order.

Hence Equation 36 is given.

$$c_m(t_0) = \frac{1}{2(N-1)}(\log|R_0^1| + \log|R_1^1|)$$

Equation 36

If the convergent calculation continuity condition at time $t_2$ above is also satisfied, then a similar repetition improves the reliability of the micro-chaos theoretical exponent value $c_m(t_0)$ at time $t_0$.

The micro-chaos theoretical exponent value $c_m$ can be given by Equation 21, derived from Equation 20.

$$c_m = c_1$$

Equation 21

When calculating Lyapunov spectrum by the system using Sano/Sawada's algorithm, if the time expansion matrix M is similarly provided, then the Lyapunov exponent $\lambda_m$, which corresponds to the micro-chaos theoretical exponent value $c_m$, is defined as Equation 22.

$$\lambda_m = \frac{1}{(n+1)(N-1)} \sum_{k=0}^{n} \log|R_k^{mm}|$$

Equation 22

$R_k^{mm}$ means the $m^{th}$ diagonal element in the matrix $R_k$, however in the calculation of the micro-chaos theoretical exponent value $c_m$ of a speech voice, in general, because the stable period of dynamics in the speech voice is short, and the convergent calculation is repeated for approximately several to a dozen times when the data is taken from the quotidian conversation voice, the definition by above Equation 20 provides a much stabler process in accordance with some experimental results.

SiCECA outputs ($t_0$, $c_m(t_0)$, $\epsilon_s(t_0)$) for the input $x(i)(=s_{[t0, t1]}(t))$ in the calculation of micro-chaos theoretical exponent value $c_m$.

When a continuous speech voice signal s=s(t) is processed by SiCECA, it is possible to obtain first, by the process (S200) for calculating microscopic chaos theoretical exponent values, with respect to each processing unit cut out from a continuous voice by applying the periodicity condition and the like, a set comprising as components a list (t, $c_m(t)$, $\epsilon_s(t)$) consisting of the spoken time t of each of data sampled from the speech voice, its micro-chaos theoretical exponent value $c_m(t)$ at the time and the SiCECA neighborhood distance $\epsilon_s(t)$ to which the micro-chaos theoretical exponent value is given. A process (S400) for calculating the macroscopic chaos theoretical exponent value with respect to thus calculated result is executed and a macroscopic chaos theoretical exponent value is calculated. In the following description, a process for calculating the macroscopic chaos theoretical exponent value will be described in greater details.

If the period T of a processing unit, which is calculated when that processing unit is cut out by applying the periodicity condition and the like to a continuous speech voice signal s=s(t) is combined to the list (t, $c_m(t)$, $\epsilon_s(t)$) of the above-cited SiCECA neighborhood distance $\epsilon_s(t)$, it is possible to obtain a list (t, $c_m(t)$, $\epsilon_s(t)$, T(t)) which includes the period at the spoken time (S410).

The processing result of the continuous speech voice signal s=s(t) by the micro-chaos theoretical exponent value processing function of SiCECA will be given by Equation 23.

$$CEm(t)=\{(c_m(t),\epsilon_s(t),T(t))|t=0,1,\ldots\}$$

Equation 23 where t is the time quantized by the interval $\Delta t$ of sampling.

CEm: Cerebral_Exponent_micro

SiCECA calculates, from the calculation result CEm(t) of the micro-chaos theoretical exponent value $c_m(t)$, the macro-chaos theoretical exponent value $c_M(t)$ for each phoneme constituting a continuous speech voice, using the following processing.

In the duration of each phoneme constituting the continuous speech voice during this time, the above-cited period T maintains an almost stable value, although some gradual changes or some changes of several percents or less may be present.

For example, in case of Japanese language, when the period of phoneme /a/ is designated as $T_a$, the period of phoneme /i/ as $T_i$, the period of phoneme /u/ as $T_u$, the period of phoneme /e/ as $T_e$ and the period of phoneme /o/ as $T_o$, $T(t)$ is a function such that $T_a = T(t|t_0 \leq t \leq t_1)$ (this can be $T_a$ in an interval), $T_i = T(t|t_2 \leq t \leq t_3)$ (this can be $T_i$ in another interval).

In an actual speech voice, there are cases where a plurality of vowels have the same period, or on the contrary, the same vowel may have different periods depending on the existing position in a phrase or the relationship with the preceding and succeeding consonants. However, as long as a generic speech is made, the continuation state of individual vowels separated by consonants and punctuation marks can be sufficiently recognizable from $T(t)$ without any dependence on languages or without receiving any influence from the high and low of the voice or from gender.

SiCECA calculates, for the duration of individual vowel in $T(t)$, one macro-chaos theoretical exponent value $c_m(t)$ or up to several values thereof by dividing the duration into predetermined processing times if the duration of vowel is long.

It should be noted that, SiCECA does not distinguish vowels and consonants in the calculation of macro-chaos theoretical exponent value $c_M(t)$, however, since the consonants do not exhibit any clear periodicity when compared to vowels, it is not possible to stably calculate their macro-chaos theoretical exponent values for consonants.

In $CEm(t)$, if $T(t|t_0 \leq t \leq t_1)$ is almost stably $T_a$ in $t_0 \leq t \leq t_1$ (in other words, stable period is such that the period $T(t)$ has a changing rate not more than a predetermined value (a predetermined arbitrary value) when compared with the period $T(t)$ of a given time), then the macro-chaos theoretical exponent value $c_M(t|t_0 \leq t \leq t_1)$ can be calculated by Equation 24 (S420, S430). Then a subset $CEm(t|t_0 \leq t \leq t_1)$ is generated from $CEm(t)$ by Equation 24 (S440).

$$CEm(t|t_0 \leq t \leq t_1) = \{(c_m(t), \epsilon_s(t), T(t)) | t_0 \leq t \leq t_1\} \quad \text{Equation 24}$$

In $CEm(t|t_0 \leq t \leq t_1)$, its constituting elements $(c_m(t), \epsilon_s(t), T(t))$ are sorted by the size of $\epsilon_s(t)$ in ascending order to obtain Equation 25 (S450).

$$CEm(i|1 \leq i \leq n) = \{(c_m(i), \epsilon_s(i), T(i)) | 1 \leq i \leq n\} \quad \text{Equation 25}$$

where $(c_m(i), \epsilon_s(i), T(i))$ is the $i^{th}$ element in $CEm(i|1 \leq i \leq n)$ by counting from the smallest, and n is the number of total elements.

The macro-chaos theoretical exponent value $c_M(t|t_0 \leq t \leq t_1)$ with respect to $CEm(t|t_0 \leq t \leq t_1)$ can be given by Equation 26 when $i_{\epsilon((p|0<p \leq 1)}$ is defined as the parameter of the SiCECA neighborhood distance $\epsilon_s(t)$ in the setting of macroscopic chaos theoretical exponent values (S460).

$$c_M^p(t | t_0 \leq t \leq t_1) = \frac{1}{i_{\epsilon(p)}} \sum_{i=1}^{i_{\epsilon(p)}} c_m(i) \quad \text{Equation 26}$$

where $i_{\epsilon(p)}$ is in $CEm(i|1 \leq i \leq n)$, the exponent which provides the micro-chaos theoretical exponent value $c_m(i_{\epsilon(p)})$ when $\epsilon_s(t)$ is $(n \times p)^{th}$ by counting from the smallest (p satisfies $0 < p \leq 1$).

The calculation processing of the above macro-chaos theoretical exponent value $c_M(t)$ is implemented by extracting the neighborhood points corresponding to the origin by the predetermined number in the order of nearest to farthest from within the entire search area (the range can be set from the least required to the most sufficient).

In the calculation of Lyapunov spectrum or Lyapunov exponent, when generating the neighborhood points set in such a manner, the predetermined neighborhood distance is set to be relatively larger so as for not less than a predetermined number of points to always satisfy, from the entirety of the search range, or for almost all origins, the neighborhood condition by the neighborhood distance.

Namely, the neighborhood distance sets its size with respect to the relationship between the required processing accuracy and the calculation time allowed for processing, and therefore for implementing the maximum accuracy the neighborhood distance must be set so as for all points in the search area to satisfy it as the neighborhood point condition.

In S460 above, $c_M^p(t|t_0 \leq t \leq t_1)$ extracts elements up to $(n \times p)^{th}$ by counting from the smallest $\epsilon_s(t)$ from elements of $CEm(i|1 \leq i \leq n)$, or extracts elements of p of smaller $\epsilon_s(t)$ as the ratio to the size of $CEm(i|1 \leq i \leq n)$ and provides the mean values of micro-chaos theoretical exponent value $c_m(i)$ of respective elements.

Now designating p in the above S460 in percentage, for example when p=10%, for example, the smaller elements of $\epsilon_s(t)$ of the number of 10% of the size of the set $CEm$ $(i|1 \leq i \leq n)$ are extracted, and the macro-chaos theoretical exponent value $c_M^{10}(t|t_0 \leq t \leq t_1)$ is defined as the mean value of micro-chaos theoretical exponent value $c_m(i)$ of each of extracted elements.

The procedure is the same for $c_M^{20}(t|t_0 \leq t \leq t_1)$, $c_M^{30}(t|t_0 \leq t \leq t_1)$, ..., and so on.

S450 and S460 stated above may calculate as follows, provided that the temporal resolution is not needed to be relatively high, namely a high precision is not required, in the observation of temporal changes in the macro-chaos theoretical exponent value $c_M(t|t_0 \leq t \leq t_1)$. First, in $CEm$ $(t|t_0 \leq t \leq t_1)$, based on the size of $\epsilon_s(t)$, constituting elements $(c_m(t), \epsilon_s(t), T(t))$ are derived by Equation 30

$$CEm(r;t|t_0 \leq t \leq t_1) = \{(c_m(t), \epsilon_s(t), T(t)) | \epsilon_s < r; t_0 \leq t \leq t_1\} \quad \text{Equation 30}$$

The macro-chaos theoretical exponent value $c_M(t|t_0 \leq t \leq t_1)$ of $CEm(t|t_0 \leq t \leq t_1)$ may be provided from Equation 31, with respect to the SiCECA neighborhood distance $\epsilon_s(t)$.

$$c_M^r(t | t_0 \leq t \leq t_1) = \frac{1}{Nr} \sum^{Nr} (c_m | c_m \in \underline{CEm}(t | t_0 \leq t \leq t_1)) \quad \text{Equation 31}$$

where $N_r$ is the number of $c_m$ satisfying $c_m \in CEm$ $(t|t_0 \leq t \leq t_1)$.

The calculation processing of the macro-chaos theoretical exponent value $c_M(t)$ stated above is implemented by extracting the predetermined number (the range can be set from the least required to the most sufficient) of neighborhood points to the origin, in the increasing order from the temporally nearest to the origin.

Now designating r as the percentage of the strange attractor radius, when r=10%, for example, the macro-chaos theoretical exponent value $c_M^{10}(t|t0 \leq t \leq t1)$ is defined, from $CEm(t|t_0 \leq t \leq t_1)$, as the mean value of the micro-chaos theoretical exponent value $c_m(t)$ less than 10% of the strange attractor radius at the time when the SiCECA neighborhood distance $\epsilon_s(t)$ provides $c_m(t)$. The same procedure is applied to $c_M^{20}(t|t_0 \leq t \leq t_1)$, $c_M^{30}(t|t_0 \leq t \leq t_1)$, ..., and so on.

The macro-chaos theoretical exponent value can be defined by either of those two procedures.

The processing unit used when calculating the macro-chaos theoretical exponent value $c_M$ from the micro-chaos theoretical exponent value $c_m$ is appropriate to be set to the predetermined period of time, or the duration of a phoneme for processing some ordinary speech voice, however if the same phoneme continues for several hundreds milliseconds to several seconds or more, then the cerebral activity is considered to be changing even during this continuous period of time. Accordingly it is appropriate to split the phoneme into a time span of approximately up to 200 milliseconds, namely into a processing unit of approximately 200 milliseconds, and to calculate the macro-chaos theoretical exponent value $c_M$ from the micro-chaos theoretical exponent value $c_m$ for each of split processing units.

In addition, in either case when determining the SiCECA neighborhood rate as p from the sequential permutation of the SiCECA neighborhood distance $\epsilon_s(t)$ as in S450 and S460, or when determining the SiCECA neighborhood rate as r from the size of SiCECA neighborhood distance $\epsilon_s(t)$ as in the variation of S450 and S460, the processing to evaluate the macro-chaos theoretical exponent value $c_M$ from the time series signal subsequent to the above processing is similar.

The macro-chaos theoretical exponent value $c_M^p(t)$ may be calculatable for any given p of 0%<p≦100% in a mechanical sense. To evaluate the cerebral activity of a speaker from the speech voice (time series signal) via the chaos theoretical exponent values, p is preferably set to 10%≦p≦30%.

The macro-chaos theoretical exponent value $c_M^r(t)$ may be calculatable for any given r of 0%<r≦100% in a mechanical sense. However, when the time series signal subjected to a processing by SiCECA has an intensive chaoticity like the speech voice signal, r≦10% is required for detecting the level of noises being convoluted on the time series signal (speech voice signal) and disturbing the chaoticity thereof, because the change rate abruptly decreases at r>10%.

Furthermore, similarly to the case where SiCECA neighborhood rate p is used, the macro-chaos theoretical exponent value $c_M$ is provided as the mean value of micro-chaos theoretical exponent values $c_m$, such as in Equation 26 and Equation 31, the accuracy of the macro-chaos theoretical exponent value $c_M$ decreases if $i_{\epsilon(p)}$ becomes smaller in Equation 26, or if $N_r$ becomes smaller in Equation 31, so that r needs to be 2% to 3% or more.

The reason why SiCECA has such characteristics as above is that in SiCECA, the SiCECA neighborhood distance $\epsilon_s$, which corresponds to $\epsilon$ used as an neighborhood condition in the system of Sano/Sawada's algorithm, is calculated from the neighborhood points set P generated from the time series signal s(t), in other words, $\epsilon$ served as an neighborhood condition, similarly to the system of Sano/Sawada's algorithm, generates the neighborhood points set, so that it does not exist prior to the neighborhood points set.

In the system using Sano/Sawada's algorithm, $\epsilon$ may be arbitrarily set to serve as an neighborhood condition with respect to the size of the strange attractor generated in the embedding space by time series signal, while in SiCECA, the SiCECA neighborhood distance $\epsilon_s$ which is calculated for the neighborhood points set generated from the time series signal will stay significantly small as compared to the size of the strange attractor if the time series signals to be processed has sufficient chaotic characteristics to generate an explicit strange attractor in the embedding space.

In the calculation of the micro-chaos theoretical exponent value $c_m$, the neighborhood condition in SiCECA can be set in such a way that, for example $\epsilon_s \leq \epsilon_c$, where $\epsilon_s$ the diameter (or radius) of a neighborhood hypersphere, and $\epsilon_c$ is 30% of the diameter (or radius) of the smallest hypersphere which includes strange attractors. This is for reducing the processing time by eliminating the processing for signals having no chaoticity, such as a white noise. If the time required for signal processing is not a matter of consideration, or if the processing time is allowed to take relatively longer as compared to the neighborhood condition setting in the calculation process of the macro-chaos theoretical exponent value $c_M$ from the micro-chaos theoretical exponent value $c_m$, the neighborhood condition setting is not a requirement in SiCECA.

By mechanically applying SiCECA to the white noise without applying any neighborhood condition, the SiCECA neighborhood distance $\epsilon_s$ calculated for the neighborhood points set being generated will be, at its maximum, equal to the size of attractor constituted in the embedding space by that white noise (this is not strictly an attractor).

The above description shows the significant property of SiCECA, which is a system using a completely different algorithm from the system of Sano/Sawada's algorithm, while it performs a similar calculation processing thereto.

In addition, when the time series signal to be processed includes noises which may disturb the chaoticity, there is not known to date any technique for definitively calculating the first Lyapunov exponent of the dynamics generating the chaoticity, and if the first Lyapunov exponent of the dynamics generating the chaoticity is estimated by using a conventional system such as the system of Sano/Sawada's algorithm, it is necessary to vary $\epsilon$ as an neighborhood condition to find the $\epsilon$ which yields the least change of the calculated first Lyapunov exponent (the first Lyapunov exponent calculated for that $\epsilon$ is thought to be the first Lyapunov exponent of the dynamics generating the chaoticity), and this implies a far more amount of calculation than the case of processing of a noise-free signal. In SiCECA, without setting of any neighborhood condition or with sufficiently gradual setting of an neighborhood condition, the first Lyapunov exponent of the dynamics generating the chaoticity can be estimated as $c_M^{100}(t)$ even when the time series signal to be processed includes the noises which disturb the chaoticity, without changing any processing procedure.

To evaluate the cerebral activity of a speaker via the speech voice by using the chaos theoretical exponent value, since there is no ideal, noise-free speech voice sample, the exponent value which is increased by the noise must be calculated along with the exponent value expected for a noise-free case, and SiCECA is a system which is capable of efficiently calculating both exponent values.

As an experimental fact, when a voice sample which may have a sufficiently wide band of approximately 20 Hz to 20 kHz and sufficiently clearly recorded by a microphone, is digitized by an A/D converter and processed by SiCECA, $c_M^{100}(t)$ thus calculated does not intensively depend on the speaker, and what is thought to be an individual difference is not more than several tens percents. The macro-chaos theoretical exponent values $c_M^p(t)$ and $c_M^r(t)$ calculated from the speech voice are exponent values unbiased to the blood pressure and pulses, being distinguished from exponent values having individual differences of more than several hundreds percents, such as steroid concentration in the blood or saliva. For the purpose of observing changes of stresses and the like to the speech contents, therefore any preadjustment such as initialization and calibration by obtaining in advance the normal value of each individual speaker is not required.

Using the macro-chaos theoretical exponent value processing function of SiCECA, macro-chaos theoretical exponent value processing results of Equation 27 or Equation 32 are obtained from the micro-chaos theoretical exponent value CEm(t) derived from a continuous speech voice signal s=s(t).

$$CEM(p,t)=\{c_M^p(t)|0<p\leq 1|t=0,1,\ldots\}$$ Equation 27 where t is the time quantized by the time interval $\Delta t$ of sampling.

CEM: Cerebral_Exponent_MACRO $$CEM(r,t)=\{c_M^r(t)|0<r\leq 1|t=0,1,\ldots\}$$ Equation 32 where t is the time quantized by the time interval $\Delta t$ of sampling.

CEM: Cerebral_Exponent_MACRO

The suffixes p and r added to the macro-chaos theoretical exponent values $c_M^p(t)$ and $c_M^r(t)$ are to be notated in percentages.

When evaluating the cerebral activity based on the speech voice by the chaos theoretical exponent value, as an experimental result, it is sufficient in the ordinary speech voice analysis to set p to approximately 20% or r to approximately 10% in order to detect the stresses to the speech contents. If the clarity of speech voice is high, the detection sensitivity of stresses to the speech contents can be improved by setting p to approximately 10% or r to approximately 5%.

Although p or r need to be set as small as possible in order to improve the detection sensitivity of stresses to the speech contents, it becomes difficult to obtain stable processing results if the dynamic range of the clarity of speech contents or the A/D converter is insufficient.

On the contrary, there may be cases where p needs to be set to approximately 30% or more to improve the measurement reliability if the clarity of a speech voice is not sufficient due to the situation such as environmental noises.

When using r as a SiCECA neighborhood rate, as compared to when using p as a SiCECA neighborhood rate, temporal resolution in the evaluation of stress state relatively decreases. In theory $c_M^{100}(t)$ values become the same even if either p or r is used as a SiCECA neighborhood rate.

On the contrary, there may be cases where p needs to be set to approximately 30% or more to improve the measurement reliability if the clarity of speech voice is not sufficient due to the situation such as environmental noises. However the measurement sensitivity decreases in such cases.

Through the process as stated above, SiCECA uses its micro-chaos theoretical exponent value processing function and macro-chaos theoretical exponent value processing function thereby to process the voice signal s(t) based on Equation 28 or Equation 33 and obtain the processing result of chaos theoretical exponent value SiCECA (s(t)) (S470).

The processing result of chaos theoretical exponent value SiCECA (s(t)) when using p as a SiCECA neighborhood rate is Equation 28, while the processing result of chaos theoretical exponent value SiCECA (s(t)) when using r as a SiCECA neighborhood rate is Equation 33.

$$SiCECA(s(t))=\{(CEm(t),(CEM(p,t))|0<p\leq 1|t=0,1,\ldots\}$$

$$s(t)=\{s_t|t=0,1,\ldots\}$$

$$CEm(t)=\{(c_m(t),\epsilon_s(t),T(t))|t=0,1,\ldots\}$$

$$CEM(p,t)=\{c_M^p(t)|0<p\leq 1|t=0,1,\ldots\}$$ Equation 28 where t is the time quantized by the time interval $\Delta t$ of sampling.

$$SiCECA(s(t))=\{(CEm(t),CEM(r,t))|0<r\leq 1|t=0,1,\ldots\}$$

$$s(t)=\{s_t|t=0,1,\ldots\}$$

$$CEm(t)=\{(c_m(t),\epsilon_s(t),T(t))|t=0,1,\ldots\}$$

$$CEM(r,t)=\{c_M^r(t)|0<r\leq 1|t=0,1,\ldots\}$$ Equation 33 where t is the time quantized by the time interval $\Delta t$ of sampling.

SiCECA calculates local micro-chaos theoretical exponent values and macro-chaos theoretical exponent values while verifying the dynamics stability with respect to the time series signal input, which was impossible for a conventional system such as those using Sano/Sawada's algorithm to implement. SiCECA outputs a micro-chaos theoretical exponent value in correspondence with each sampling time of time series signal, detects the durations and times, in the time series signal, where the dynamics remains stable and outputs a macro-chaos theoretical exponent value with respect to each of the times. Therefore, it outputs as many macro-chaos theoretical exponent values as the number of detected dynamics if the dynamics changes quickly in short period of time as is the case of a speech voice including a dozen or more of phoneme per second in average.

The term "macro" used herein is a concept opposing to "micro". If a graph is drawn directly from the temporal changes of macro-chaos theoretical exponent value, obtained from the SiCECA processing of speech voices, only sudden changes are observed at the temporal interval of several tens milliseconds to a hundred tens milliseconds, and the cerebral activity of speaker on the time scale of seconds or minutes cannot be observed.

In order to visually observe the chronological fluctuation of cerebral activity based on the speech voice, in a SiCECA process, an additional temporal moving averaging processing and such with respect to the macro-chaos theoretical exponent values CEM(p, t) or CEM(r, t) is performed thereby to chronologically smooth the changes (S500).

The chronological smoothing of macro-chaos theoretical exponent values CEM(p, t) or CEM(r, t) is done, because, when processing an ordinary speech voice, which includes a plurality of vowels, the processing result derived from a plurality of different dynamics is included in the processing results CEM(p, t) and CEM(r, t) only with the temporally sequential order without regard to the difference in dynamics.

For an ordinary speech voice, by setting the processing unit to a length not shorter than the length where the rate of each included vowel becomes stable, the moving average processing with the interval set as stated above allows the change and the like of stress status of the speaker with respect to the speech contents to be observed at the resolution of the processing unit used.

When observing the changes of stress status of a speaker with respect to the speech contents in an ordinary speech, it is sufficient to perform a normal moving averaging on CEM(20%, t)=$\{c_M^{20}(t)|t=0, 1, \ldots\}$ with the width of moving averaging of 30 seconds and with the moving interval of 1 second. The rise and fall of stresses may be visually observed by plotting the results as a graph.

If one desires the observation at a much higher temporal resolution of the stress status of a speaker with respect to the speech contents, it is needed to extract only CEM(p, t) and CEM(r, t) for specific dynamics from the SiCECA (s (t)) in Equation 28 or Equation 32 then to graph the temporal changes.

When extracting CEM(p, t) and CEM(r, t) for specific dynamics from the SiCECA (s (t)), $\epsilon_s(t)$ and T(t) of CEm(t) can be used as the filtering parameters.

The result of such a filtering processing is given by Equation 29 or Equation 34. Equation 29 is the result of using p as a SiCECA neighborhood rate, while Equation 34 is the result of using r as a SiCECA neighborhood rate.

$$\text{SiCECA}^p(s(t)) = \{((CEm(t), CEm(p,t))^\wedge(\epsilon_s^p = \epsilon_s(t))^\wedge \\ (T_0 = T(t)))|0 < p \leq 1|t=0,1,\ldots\} \quad \text{Equation 29}$$

where t is the time quantized by the interval Δt of sampling;

p is set with respect to the clarity of the signal being processed or the target sensitivity.

$$\text{SiCECA}^r(s(t)) = \{((CEm(t), CEm(r,t))^\wedge(\epsilon_s^r = \epsilon_s(t))^\wedge \\ (T_0 = T(t)))|0 < r \leq 1|t=0,1,\ldots\} \quad \text{Equation 34}$$

where t is the time quantize by the interval Δt of sampling.

r is set with respect to the clarity of the signal being processed or the target sensitivity.

SiCECA$^r$ (s(t)) shown in Equation 34 means a set of macro-chaos theoretical exponent values calculated from the micro-chaos theoretical exponent values at those times where the SiCECA neighborhood distance is $\epsilon_s^r = \epsilon_s(t)$ and the periodicity condition is $T_0 = T(t)$.

The implementation of the present invention consists of, needless to say, supplying a recording medium storing the system carrying out the functionality of the preferred embodiment, and executing the system stored in the recording medium by the computer of that system.

In such a case, the system itself read out from the recording medium implements the functionality of said embodiment, therefore the recording medium storing the system is naturally a part of the present invention. In addition, the procedure of executing the system, the computer system for executing, devices, methods, as well as the carrier waves that are communicated through electric communication lines (network) are also part of the present invention.

The type of recording medium for supplying the system includes for example magnetic disks, hard disks, optical disks, magneto-optical disks, magnetic tapes, non-volatile memory cards and the like.

The functionality of the preferred embodiments mentioned above may be practiced by executing the program read by the computer, while the operating system running on the computer performs part or all of the actual processing based on the instruction provided by the program, and the functionality of the preferred embodiments practiced by the processing may also be included in the present invention.

In addition, after the system read out from the recording medium is written into a non-volatile or volatile storage means equipped with an expansion card inserted in the computer or an expansion unit connected to the computer, a processing unit equipped with the expansion card or expansion unit based on the instruction provided by the system performs part or all of the actual processing to implement thereby the functionality of the preferred embodiments stated above.

INDUSTRIAL APPLICABILITY

The present invention makes it possible to calculate a chaos theoretical exponent value in a system where dynamics changes along with the time, in particular to perform a fast calculation of a microscopic chaos theoretical exponent value.

The microscopic chaos theoretical exponent value, in its form, is similar to the first Lyapunov exponent one of chaos theoretical exponents, and SiCECA has partly a structure similar to the system using Sano/Sawada's algorithm as a system for calculating the Lyapunov exponents, in the part which relates to aspect of micro-chaos theoretical exponent values.

However, SiCECA is a completely different system from the system using Sano/Sawada's algorithm in its signal processing condition and procedure as have been described above.

Sano/Sawada's algorithm corresponds to a generic time series signal processing, while SiCECA is applicable to signals having a periodicity, such as speech voice signals. In addition, conventional systems including the system using Sano/Sawada's algorithm calculates, in principle, one single first Lyapunov exponent for signal cut out as a processing unit, while in SiCECA, on the other hand, no explicit processing unit exists which is set to a constant time duration or a fixed data size, and SiCECA calculates, in principle, a microscopic chaos theoretical exponent value for every sampling time (or a microscopic chaos theoretical exponent value if the data to be processed is a speech voice).

Also, SiCECA makes it possible to detect changes of dynamics in a sequence of time series signals, owing to the characteristics as stated above, whereby it controls whether to continue or abort the convergent calculation in the calculation of the microscopic chaos theoretical exponent value, the microscopic chaos theoretical exponent values thus calculated have each a value with respect to respective, stable dynamics. The conventional systems including such as the system using Sano/Sawada's algorithm where a constant processing unit is set as a temporal width, in contrast, makes it impossible to obtain proper results in case where a mixture of data generated by a plurality of dynamics is present in the processing unit due to change of dynamics within a processing unit.

SiCECA calculates exponent values for all sampling times of the data constituting the processing data. When it processes the same amount of data as the processing units processed by the system using Sano/Sawada's algorithm, it requires processing time much longer in one decimal order or more. If the system using Sano/Sawada's algorithm attempts to calculate every exponent value for all sampling times as similar to SiCECA for example by shifting processing units by one sample at a time, even though such calculation cannot yield any result having a meaning comparable to SiCECA due to the reason cited above, the system using Sano/Sawada's algorithm will take much longer processing time in several decimal orders or more than SiCECA.

SiCECA consists of a process for calculating microscopic exponent values from the time series signal and a process for calculating macroscopic exponent values from the microscopic exponent values, an appropriate configuration of parameters connecting those two processes allows the calculation of a chaos theoretical exponent value for a system of changing dynamics. For example, in the system using conventional chaos theoretical signal processing algorithm such as Sano/Sawada's algorithm for using Lyapunov exponents as exponents, the dynamics is assumed to be stable, thus these systems does not provide any effective results for the time series signal from a system of changing dynamics.

The systems of conventional algorithms, also in the process of chaotic time series signal with a noise convoluted thereon, either vary initial parameters in diverse ways in the processing or combine with another noise reduction system thereby to effectively calculate exponent values when no noise is convoluted. However there has been no system other than SiCECA, which quantifies the noise level itself in a precise way and with a processing efficiency much higher in several decimal orders or more than the use of conventional systems.

When evaluating the cerebral activity from the speech voice by a chaos theoretical exponent value, the property of SiCECA as mentioned above is indispensable, and because of such properties SiCECA allows the observation of the relation between the speech contents and the stress at the time of speech at a temporal resolution of a dozen of seconds to several tens of seconds.

When using a system using a conventional algorithm, since in any combination there is not a microscopic index value from the start and no measure is presumed to be taken to cope with the change of dynamics, any comparable results to the use of SiCECA can not be obtained.

SiCECA in accordance with the present invention is more flexible than the conventional system using Sano/Sawada's algorithm and facilitates the optimization of accommodation the architecture of a computer to which SiCECA is implemented.

The system in accordance with the present invention generates an neighborhood points set (or a formal neighborhood points set) from periodicity conditions, allowing the neighborhood points set to be generated much faster than the generation of neighborhood points set as a set of points satisfying neighborhood condition from an entire processing unit in the conventional technique, so as to reduce the computing time of the chaos theoretical exponent value significantly faster as compared to the time required for calculating the first Lyapunov exponent by the conventional system.

When processing speech voice signals sampled at 44.1 kHz, and when compared with the calculation of an average first Lyapunov exponent by the moving average method with each sample being the origin of a processing unit, by setting the processing unit time to 1 second, in a conventional technique the system in accordance with the present invention is able to calculate the average chaos theoretical exponent value in a time two decimal orders or more shorter.

In the conventional system, which generates the neighborhood points set as a set for satisfying the neighborhood condition from the entire processing units, it was not always possible to obtain a stable result if the dynamics changes within a processing unit. The system in accordance with the present invention, in contrast, which generates the neighborhood points set (or formal neighborhood points set) from the periodicity condition, makes it possible to apply the neighborhood condition or convergent calculation continuity condition in addition to the periodicity condition, thereby making it possible to calculate a chaos theoretical exponent value if stable dynamics is present and to obtain a temporally local result much more stable than ever.

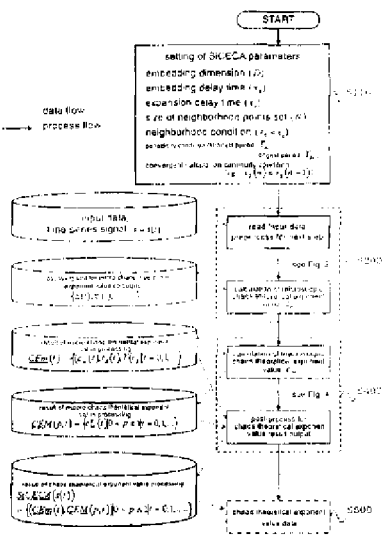

What is claimed is:

1. A chaos theoretical exponent value calculation system, comprising:
   a means for reading a time series signal to be subjected to a chaotic analysis;
   a means for cutting out said read time series signal for each processing unit for calculating a chaos theoretical exponent value with respect to a sampling time; and
   a means for calculating a chaos theoretical exponent value of said read time series signal,
   wherein said means for calculating a chaos theoretical exponent value comprises:
   a first calculation means for calculating a chaos theoretical exponent value with respect to said sampling time as a microscopic chaos theoretical exponent value, in said cut-out time series signal at a processing unit; and
   a second calculation means for calculating the chaos theoretical exponent value of said time series signal with respect to a predetermined time as a macroscopic chaos theoretical exponent value, based on said microscopic chaos theoretical exponent value.

2. The chaos theoretical exponent value calculation system according to claim 1, further comprising:
   a means for receiving, as parameters, an embedding dimension D, an embedding delay time $\tau_d$, an expansion delay time $\tau_e$, a size of neighborhood points set N, and the shortest period $T_m$ and the longest period $T_M$ of said time series signal;
   wherein said means for cutting out said time series signal for each processing unit cuts out a time series signal for each processing unit $x=x(i)$ from said time series signal based on Equation 2, where, when said read time series signal is $s=s(t)$, $t_0$ and $t_1$ in Equation 2 are given as $t_0$ and $t_1$ satisfying a periodicity condition predetermined by Equation 3;

$$x(i)=\{x_i|i=0,1,\ldots,n_0\}$$

$$n_0=(N-1)\times T_M+(D-1)\tau_d+\tau_e$$

$$x(0)=x_0=s(t_0),\ x(1)=x_1=s(t_0+1),\ \ldots,$$

$$x(n_0)=x_{n_0}=s(t_0+n_0)=s(t_1) \qquad \text{Equation 2}$$

where $t_0$ is determined in such a way that $x(i)$ satisfies a periodicity condition in SiCECA;

$$s_{[t_0,t_1]}(t)=\{s_t|t=t_0,t_0+1,\ldots,t_1-1,t_1\}$$

$$t_1-t_0+1=(N-1)\times T_M+(D-1)\tau_d+\tau_e \qquad \text{Equation 3}$$

3. The chaos theoretical exponent value calculation system according to either claim 1 or claim 2, wherein said first calculation means:
   generates a neighborhood points set $P=\{P_0, P_1, \ldots, P_{(N-1)}\}$ at said sampling time based on Equation 5;
   sets a SiCECA neighborhood distance $\epsilon_s$ at said sampling time;
   generates an expansion points set S corresponding to said neighborhood points set P based on Equation 7;
   defines a displacement vector $y_j$ of a neighborhood point and a displacement vector $z_j$ of a corresponding expansion point by Equation 8 from said neighborhood points set P and said expansion points set S;
   calculates a matrix $A_0$ which satisfies Equation 9 from said displacement vectors $y_j$ and $z_j$ based on Equation 10; and
   calculates said microscopic chaos theoretical exponent value $c_m$ by QR decomposition of said matrix $A_0$;

$$P_0=(x_0,x_{\tau_d},x_{2\tau_d},\ldots,x_{(D-1)\tau_d})$$

$$P_1=(x_T,x_{\tau_d+T},x_{2\tau_d+T},\ldots,x_{(D-1)\tau_d+T})$$

$$\ldots$$

$$P_{(N-1)}=(x_{(N-1)T},x_{\tau_d+(N-1)T},x_{2\tau_d+(N-1)T},\ldots,$$
$$x_{(D-1)\tau_d+(N-1)T}) \qquad \text{Equation 5}$$

$S = \{S_0, S_1, \ldots, S_{(N-1)}\}$ $S_0 = (x_{0+\tau_e}, x_{\tau_d+\tau_e}, x_{2\tau_d+\tau_e}, \ldots, x_{(D-1)\tau_d+\tau_e})$ $S_1 = (x_{\tau_e+T}, x_{\tau_d+\tau_e+T}, x_{2\tau_d+\tau_e+T}, \ldots, x_{(D-1)\tau_d+\tau_e+T})$

...

$S_{(N-1)} = (x_{\tau_e+(N-1)T}, x_{\tau_d+\tau_e+(N-1)T}, x_{2\tau_d+\tau_e+(N-1)T}, \ldots, x_{(D-1)\tau_d+\tau_e+(N-1)T})$   Equation 7

$\vec{y}_j = \overrightarrow{P_0 P_j} = (x_{jT} - x_0, x_{\tau_d+jT} - x_{\tau_d}, \ldots, x_{(D-1)\tau_d+jT} - x_{(D-1)\tau_d})$ $\vec{z}_j = \overrightarrow{S_0 S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$ $j = 1, 2, \ldots, N-1$   Equation 8

$\vec{z}_j = A_0 \vec{y}_j, \; j = 1, 2, \ldots, N-1$   Equation 9

$$S_0 = \sum_{j=1}^{N-1} |\vec{z}_j - A_0 \vec{y}_j|^2$$   Equation 10

$$\frac{\partial S_0}{\partial a_0^{kl}} = 0$$

where $a_0^{kl}$ is the element (k,l) of $A_0$.

4. The chaos theoretical exponent value calculation system according to either claim 1 or claim 2, wherein said first calculation means:

generates a neighborhood points set $P = \{P_0, P_1, P_{(N-1)}\}$ at said sampling time based on Equation 5;

sets a SiCECA neighborhood distance $\epsilon_s$ at said sampling time;

sets said neighborhood points candidate set P to neighborhood points set P from said cut-out processing unit, when said SiCECA neighborhood distance $\epsilon_s$ is smaller than $\epsilon_c$ predetermined for a radius of a strange attractor constructed in an embedding space;

generates an expansion points set S corresponding to said neighborhood points set P based on Equation 7;

defines a displacement vector $y_j$ of a neighborhood point and a corresponding displacement vector $z_j$ of an expansion point from said neighborhood points set P and said expansion points set S based on Equation 8;

calculates a matrix $A_0$ satisfying Equation 9 from said displacement vectors $y_j$ and $z_j$ based on Equation 10; and calculates said microscopic chaos theoretical exponent value $c_m$ by QR decomposition of said matrix $A_0$.

$P_0 = (x_0, x_{\tau_d}, x_{2\tau_d}, \ldots, x_{(D-1)\tau_d})$ $P_1 = (x_T, x_{\tau_d+T}, x_{2\tau_d+T}, \ldots, x_{(D-1)\tau_d+T})$

...

$P_{(N-1)} = (x_{(N-1)T}, x_{\tau_d+(N-1)T}, x_{2\tau_d+(N-1)T}, \ldots, x_{(D-1)\tau_d+(N-1)T})$   Equation 5

$S = \{S_0, S_1, \ldots, S_{(N-1)}\}$ $S_0 = (x_{0+\tau_e}, x_{\tau_d+\tau_e}, x_{2\tau_d+\tau_e}, \ldots, x_{(D-1)\tau_d+\tau_e})$ $S_1 = (x_{\tau_e+T}, x_{\tau_d+\tau_e+T}, x_{2\tau_d+\tau_e+T}, \ldots, x_{(D-1)\tau_d+\tau_e+T})$

...

$S_{(N-1)} = (x_{\tau_e+(N-1)T}, x_{\tau_d+\tau_e+(N-1)T}, x_{2\tau_d+\tau_e+(N+1)T}, \ldots, x_{(D-1)\tau_d+\tau_e+(N-1)T})$   Equation 7

$\vec{y}_j = \overrightarrow{P_0 P_j} = (x_{jT} - x_0, x_{\tau_d+jT} - x_{\tau_d}, \ldots, x_{(D-1)\tau_d+jT} - x_{(D-1)\tau_d})$ $\vec{z}_j = \overrightarrow{S_0 S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$ $j = 1, 2, \ldots, N-1$   Equation 8

$\vec{z}_j = A_0 \vec{y}_j, \; j = 1, 2, \ldots, N-1$   Equation 9

$$S_0 = \sum_{j=1}^{N-1} |\vec{z}_j - A_0 \vec{y}_j|^2$$   Equation 10

$$\frac{\partial S_0}{\partial a_0^{kl}} = 0$$

where $a_0^{kl}$ is the element (k,l) of $A_0$.

5. The chaos theoretical exponent value calculation system according to claim 3, wherein said first calculation method further: sets said calculated microscopic chaos theoretical exponent value Cm as a first chaos theoretical exponent value in a cerebral spectrum; and calculates an $n^{th}$ convergent value of said microscopic chaos theoretical exponent value $c_m$ by performing, after calculating said first chaos theoretical exponent value, a convergent calculation while setting a first element of said expansion points set S as a first element of a succeeding neighborhood points set P.

6. The chaos theoretical exponent value calculation system according to either claim 1 or claim 2, wherein said second calculation means:

generates a set $CEm(t) = \{c_m(t), \epsilon_s(t), T(t)\}$ having as elements a microscopic chaos theoretical exponent value $c_m$ at a sampling time t, said SiCECA neighborhood distance $\epsilon_s$ and said period T in said cut-out processing unit x(i);

generates a subset $CEm(t|t_0 \leq t \leq t_1)$ from said generated CEm(t) based on Equation 24; and extracts elements up to $(n \times p)^{th}$ ($0 < p \leq 1$) counted from a smaller side of SiCECA neighborhood distance $\epsilon_s(t)$ in said processing unit x(i) among elements of said subset, and sets the mean value of chaos theoretical exponent values $c_m(i)$ of these elements to said macroscopic chaos theoretical exponent value $c_M$;

$CEm(t|t_0 \leq t \leq t_1) = \{(c_m(t), \epsilon_s(t), T(t)) | t_0 \leq t \leq t_1\}.$   Equation 24

7. The chaos theoretical exponent value calculation system according to claim 6, wherein said second calculation means:

generates a subset $CEm(t_0 \leq t \leq t_1)$ based on said Equation 24 from said generated CEm(t), using as a stable time zone a time zone where a period T(t) has a changing rate not more than a predetermined value when compared to a period T(t) of said predetermined time.

8. The chaos theoretical exponent value calculation system according to either claim 1 or claim 2, wherein said second calculation means:

generates a set $CEm(t) = \{c_m(t), \epsilon_s(t), T(t)\}$ having as elements a microscopic chaos theoretical exponent value $c_m$ at a sampling time t and said SiCECA neighborhood distance $\epsilon_s$ and said period T in said cut-out processing unit x(i);

generates a subset $CEm(t|t_0 \leq t \leq t_1)$ from said generated CEm(t) based on Equation 30; and sets to said macroscopic chaos theoretical exponent value $c_M$ by applying Equation 31 to said generated subset $CEm(t|t_0 \leq t \leq t_1)$;

$$CEm(r, t \mid t_0 \leq t \leq t_1) = \quad \text{Equation 30}$$
$$\{(c_m(t), \varepsilon_S(t), T(t)) \mid \varepsilon_S < r, t_0 \leq t \leq t_1\}$$

$$c_M^r(t \mid t_0 \leq t \leq t_1) = \frac{1}{Nr} \sum^{Nr} (c_m \mid c_m \in \underline{CEm}(t \mid t_0 \leq t \leq t_1)) \quad \text{Equation 31}$$

where $N_r$ is the number of $c_m$ that satisfies $c_m \in$ CEm ($t \mid t_0 \leq t \leq t_1$).

9. The chaos theoretical exponent value calculation system according to claim 1, wherein said means for reading a time series signal reads a time series signal digitized by an A/D converter.

10. The chaos theoretical exponent value calculation system according to claim 1, wherein said chaos theoretical exponent value calculation system further comprises:
   a means for visualizing a chaos theoretical exponent value by smoothing temporal changes of said macroscopic chaos theoretical exponent value and outputting the changes as a graph.

11. The chaos theoretical exponent value calculation system according to claim 10, wherein said means for visualizing a chaos theoretical exponent value extracts a macroscopic chaos theoretical exponent value by performing a filtering processing based on Equation 29 or Equation 34, and visualizes the temporal changes by showing the changes in a graph;

$$\underline{SiCECA}^p(s(t)) = \{((CEm(t), CEM(p,t))\char`\^(\epsilon_S{}^p = \epsilon_S(t))\char`\^$$
$$(T_0 = T(t)))|0 < p \leq 1 | t = 0, 1, \ldots\} \quad \text{Equation 29}$$

where t is the time quantized by the interval $\Delta t$ of sampling; and p may be set in accordance with the clarity and the like or the target sensitivity of the signal being processed;

$$\underline{SiCECA}^r(s(t)) = \{((CEm(t), CEM(r,t))\char`\^(\epsilon_S{}^r = \epsilon_S(t))\char`\^$$
$$(T_0 = T(t)))|0 < r \leq 1 | t = 0, 1, \ldots\} \quad \text{Equation 34}$$

where t is the time quantized by the interval $\Delta t$ of sampling; and r may be set in accordance with the clarity and the like or the target sensitivity of the signals being processed.

12. The chaos theoretical exponent value calculation system according to claim 1:
   wherein said time series signal is a continuous speech voice signal; and
   wherein said predetermined time at a time of calculation of said macroscopic chaos theoretical exponent value is a duration of a phoneme.

13. The chaos theoretical exponent value calculation system, comprising:
   a means for reading a time series signal to be subjected to chaotic analysis;
   a means for receiving, as parameters, an embedding dimension D, an embedding delay time $\tau_d$, an expansion delay time $\tau_e$, a size of neighborhood points set N, and a shortest period $T_m$ and a longest period $T_M$ of said time series signal;
   a means for cutting out said read time series signal for each processing unit for calculating a chaos theoretical exponent value; and
   a means for calculating a chaos theoretical exponent value by subjecting said cut-out time series signal to a chaotic analysis;
   wherein said means for cutting out said time series signal for each processing unit cuts out a time series signal for each processing unit x=x(i) from said time series signal based on Equation 2, where, when said read time series signal is s=s(t), $t_0$ and $t_1$ in Equation 2 are given as $t_0$ and $t_1$ satisfying a periodicity condition predetermined by Equation 3;

$$x(i) = \{x_i | i = 0, 1, \ldots, n_0\}$$

$$n_0 = (N-1) \times T_M + (D-1)\tau_d + \tau_e$$

$$x(0) = x_0 = s(t_0), x(1) = x_1 = s(t_0 + 1), \ldots,$$

$$x(n_0) = x_{n_0} = s(t_0 + n_0) = s(t_1) \quad \text{Equation 2}$$

where $t_0$ is determined in such a way that x(i) satisfies a periodicity condition in SiCECA;

$$s_{[t_0, t_1]}(t) = \{s_t | t = t_0, t_0 + 1, \ldots, t_1 - 1, t_1\}$$

$$t_1 - t_0 + 1 = (N-1) \times T_M + (D-1)\tau_d + \tau_e \quad \text{Equation 3}$$

14. A chaos theoretical exponent value calculation system for calculating a chaos theoretical exponent value of a time series signal, comprising:
   a means for reading a time series signal to be subjected to chaotic analysis;
   a means for cutting out said read time series signal for each processing unit for calculating a chaos theoretical exponent value with respect to a sampling time as a microscopic chaos theoretical exponent value;
   a first calculation means for calculating said microscopic chaos theoretical exponent value in said cut-out time series signal for a processing unit;
   a second calculation means for calculating a chaos theoretical exponent value of said time series signal with respect to a predetermined time as a macroscopic chaos theoretical exponent value.

15. The chaos theoretical exponent value calculation system according to claim 14, wherein said means for cutting out said time series signal cuts out a stable section of signal waveforms from said time series signal as a processing unit.

16. A chaos theoretical exponent value calculation system for calculating a chaos theoretical exponent value of time series signal, comprising:
   a means for reading a time series signal to be subjected to a chaotic analysis;
   a means for cutting out said read time series signal for each processing unit for calculating a chaos theoretical exponent value with respect to a sampling time as a microscopic chaos theoretical exponent value; and
   a means for calculating a chaos theoretical exponent value by using said cut-out time series signals;
   wherein said means for cutting out said time series signal cuts out a stable section of signal waveforms from said time series signal as a processing unit.

17. The chaos theoretical exponent value calculation system according to claim 16, wherein said means for calculating a chaos theoretical exponent value comprises:
   a first calculation means for calculating said microscopic chaos theoretical exponent value in said cut-out time series signal for a processing unit;
   a second calculation means for calculating a chaos theoretical exponent value of said time series signal with respect to a predetermined time as a macroscopic chaos theoretical exponent value.

18. The chaos theoretical exponent value calculation system according to claim 14 or claim 17, wherein said chaos theoretical exponent value calculation system further comprises:

a means for visualizing a chaos theoretical exponent value by smoothing and outputting as a graph temporal changes of said macroscopic chaos theoretical exponent value.

19. The chaos theoretical exponent value calculation system according to claim 18, wherein said means for visualizing said chaos theoretical exponent value visualizes a chaos theoretical exponent value by extracting said macroscopic chaos theoretical exponent value for a specific dynamics from said chaos theoretical exponent value and showing in a graph its temporal changes.

20. The chaos theoretical exponent value calculation system according to either claim 14 or claim 17,
wherein said time series signal is a continuous speech voice signal; and
wherein said predetermined time at a time of calculating said macroscopic chaos theoretical exponent value is a duration of a phoneme.

21. The chaos theoretical exponent value calculation system according to any one of claims 14 to 16, wherein said means for cutting out said time series signal comprises:
a calculation means for calculating a period of a strange attractor from a frequency spectrum obtained from said time series signal at a time of cutting out as a processing unit;
a means for obtaining data showing a period of said calculated strange attractor; and
a means for cutting out as a processing unit a time series signal which gives a periodicity, when said obtained data showing a period satisfies a predetermined periodicity condition.

22. The chaos theoretical exponent value calculation system according to claim 18, wherein said means for calculating a period of said strange attractor uses in a calculation of said frequency spectrum either one of Fourier transform, a linear prediction analysis and a wavelet transform.

23. The chaos theoretical exponent value calculation system in accordance with either claim 14 or claim 17, wherein said first calculation means comprises:
a means for generating an neighborhood points set by using a periodicity condition with respect to said time series signal cut out as said processing unit;
a means for generating an expansion points set with respect to said neighborhood points set;
a means for calculating a cerebral spectrum from said neighborhood points set and said expansion points set; and
a means for calculating said microscopic chaos theoretical exponent value from said cerebral spectrum.

24. A chaos theoretical exponent value calculation system according to claim 23, wherein said means for generating said neighborhood points set:
generates a candidate of a neighborhood points set from said cut-out time series signals; and
applies a predetermined neighborhood condition to said neighborhood points candidate set and generates a set which satisfies said condition as a neighborhood points set.

25. The chaos theoretical exponent value calculation system according to claim 23, wherein said first calculation means further comprises:
a means for calculating a microscopic chaos theoretical exponent value by performing, after calculating a first microscopic chaos theoretical exponent value, a convergent calculation while setting a first element of said expansion points set to a first element of a succeeding neighborhood points set.

26. The chaos theoretical exponent value calculation system according to claim 23, wherein said first calculation means further comprises:
a means for generating, after generating said expansion points set, a candidate of a new neighborhood points set having as an origin constituting component a point at the earliest time in time sequence, among expansion points constituting said generated expansion points set;
a means for applying a predetermined neighborhood condition to said candidate of new neighborhood points set and generating a new neighborhood points set that satisfies the condition;
a means for applying a predetermined convergent calculation continuity condition to said new neighborhood points set and generating an expansion points set in correspondence with said new neighborhood points set; and
a means for calculating $n^{th}$ convergent value of said cerebral spectrum by calculating a new cerebral spectrum from said new neighborhood points set and said new expansion points set; and
repeats, while said new neighborhood points set satisfies said convergent calculation continuity condition, a convergent calculation.

27. The chaos theoretical exponent value calculation system according to claim 26, wherein said convergent calculation is repeated, until a processing unit for next calculation having a first element of said expansion points set as its origin does not satisfy a periodicity condition or an additional signal processing condition for cutting out a periodicity condition, or until said processing unit does not provide a neighborhood points set which satisfies said periodicity condition or said convergent calculation continuity condition.

* * * * *

UNITED STATES PATENT AND TRADEMARK OFFICE
CERTIFICATE OF CORRECTION

PATENT NO. : 7,321,842 B2  
APPLICATION NO. : 10/546479  
DATED : January 22, 2008  
INVENTOR(S) : Shiomi et al.

Page 1 of 1

It is certified that error appears in the above-identified patent and that said Letters Patent is hereby corrected as shown below:

Delete Title Page in its entirety, and insert attached Title Page.

Title page, item (73), line 3, "Admiinistrative" should read --Administrative--.

Signed and Sealed this

Fifth Day of May, 2009

JOHN DOLL  
*Acting Director of the United States Patent and Trademark Office*

United States Patent
Shiomi et al.

(10) Patent No.: US 7,321,842 B2
(45) Date of Patent: Jan. 22, 2008

(54) CHAOS INDEX VALUE CALCULATION SYSTEM

(75) Inventors: Kakuichi Shiomi, 401, Metro Building, 5-11, Higashi-shimbashi 2-chome, Minato-ku, Tokyo, 105-0021 (JP); Susumu Kobayashi, Migawa-Mansion 206, 85-2, Migawa 2-chome, Mito-shi, Ibaraki 310-0912 (JP)

(73) Assignees: Electronic Navigation Research Institute, an Independent Administrative Institution, Tokyo (JP), part interest; Kakuichi Shiomi, Tokyo (JP), part interest; Susumu Kobayashi, Ibaraki (JP), part interest (*) Notice: Subject to any disclaimer, the term of this patent is extended or adjusted under 35 U.S.C. 154(b) by 0 days.

(21) Appl. No.: 10/546,479
(22) PCT Filed: Dec. 26, 2003
(86) PCT No.: PCT/JP03/16954
§ 371 (c)(1), (2), (4) Date: Jul. 21, 2006
(87) PCT Pub. No.: WO2004/075074
PCT Pub. Date: Sep. 2, 2004

(65) Prior Publication Data
US 2006/0265444 A1 Nov. 23, 2006
US 2007/0174377 A2 Jul. 26, 2007

(30) Foreign Application Priority Data
Feb. 24, 2003 (JP) ............... 2003-045386

(51) Int. Cl.
*G06F 19/00* (2006.01)
(52) U.S. Cl. .................. 702/181; 714/25
(58) Field of Classification Search ............ 702/181, 702/182, 185; 714/4, 100, 5, 25, 30, 48
See application file for complete search history.

(56) References Cited

U.S. PATENT DOCUMENTS
6,422,998 B1 * 7/2002 Vo-Dinh et al. ............ 600/300
6,904,390 B2 * 6/2005 Nikitin et al. .............. 702/188

FOREIGN PATENT DOCUMENTS
JP 7116119 5/1995
(Continued)

OTHER PUBLICATIONS
M. Sano and Y. Sawada "Measurement of the Lyapunov Spectrum from a Chaotic Time Series," Physical Review Letters, vol. 55, No. 10, Sep. 2, 1985, pp. 1082-1085.
(Continued)

*Primary Examiner*—Edward Raymond
(74) *Attorney, Agent, or Firm*—Finnegan, Henderson, Farabow, Garrett & Dunner, L.L.P.

(57) ABSTRACT

The present invention provides a system for analyzing a time series signal by a method of Chaos Theory and calculating a chaos theoretical exponent value.

It is a chaos theoretical exponent value calculation system comprising: a means for receiving an input of predetermined parameters, a means for reading a time series signal, a means for cutting out from the read time series signal a time series signal for each processing unit $x=x(i)$, a means for calculating a chaos theoretical exponent value of the read time series signal, and a means for outputting a chaos theoretical exponent value of the calculated time series signal, wherein the means for calculating a chaos theoretical exponent value comprises: a means for calculating a chaos theoretical exponent value for a sampling time in a time series signal of the cut-out processing unit $x=x(i)$, and a means for calculating, based on the chaos theoretical exponent value for the sampling time, a chaos theoretical exponent value of a time series signal for a predetermined time.

27 Claims, 12 Drawing Sheets

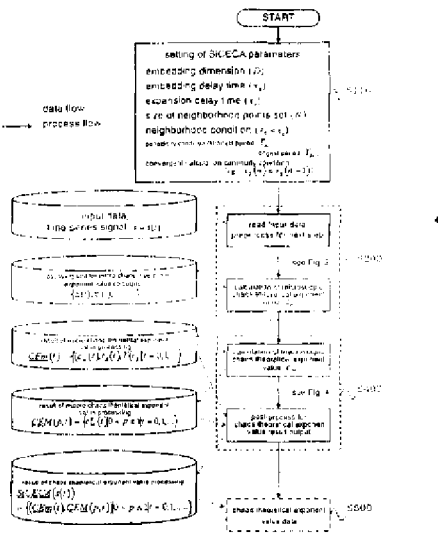

UNITED STATES PATENT AND TRADEMARK OFFICE
CERTIFICATE OF CORRECTION

PATENT NO.         : 7,321,842 B2                    Page 3 of 9
APPLICATION NO.    : 10/546479
DATED              : January 22, 2008
INVENTOR(S)        : Shiomi et al.

Figure 1:
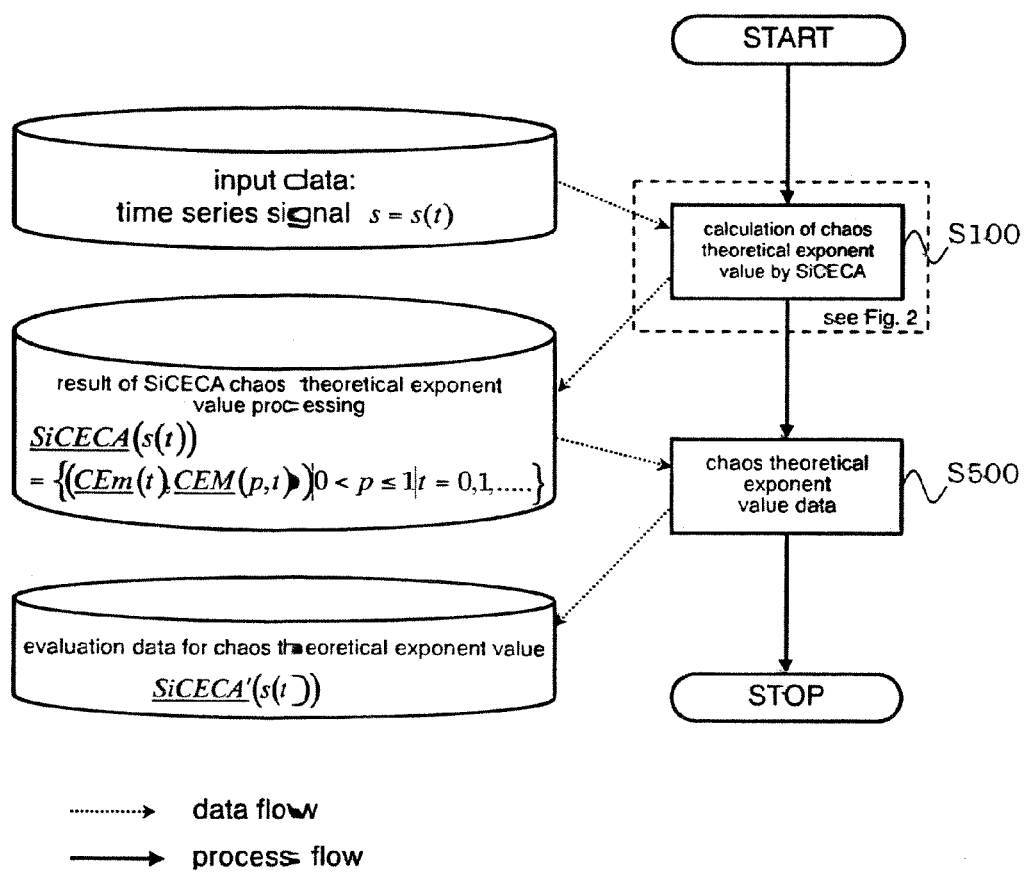
FIG. 1 is a flowchart showing the overview of process flow in accordance with the present invention.

It is certified that error appears in the above-identified patent and that said Letters Patent is hereby corrected as shown below:

Please delete Figure 1 in its entirety and insert the following:

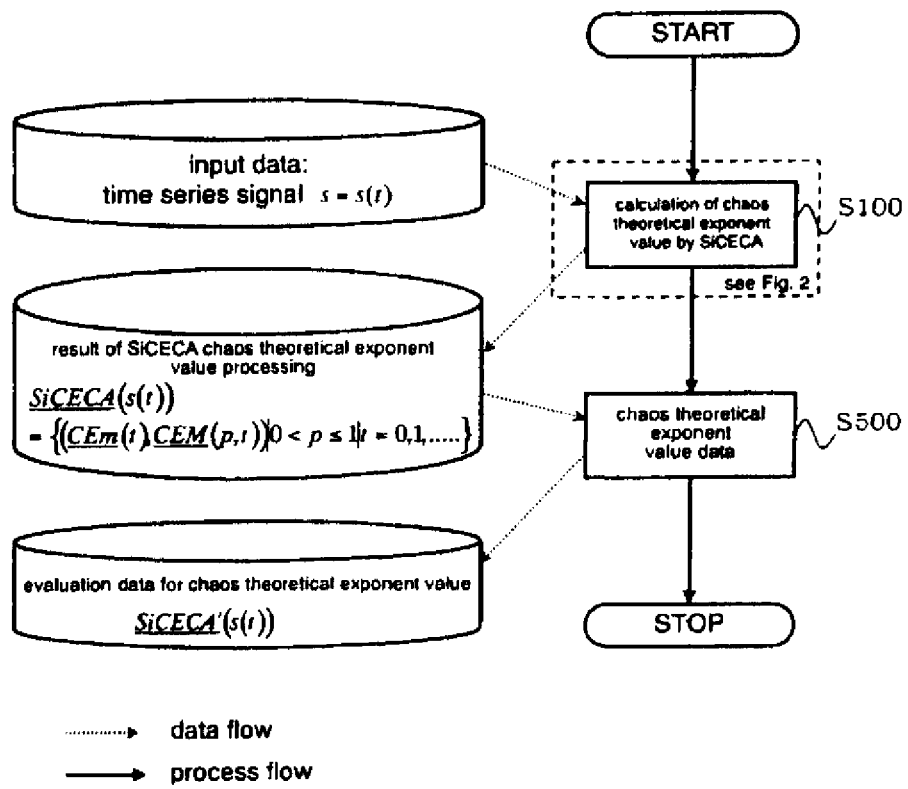

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

Figure 2:
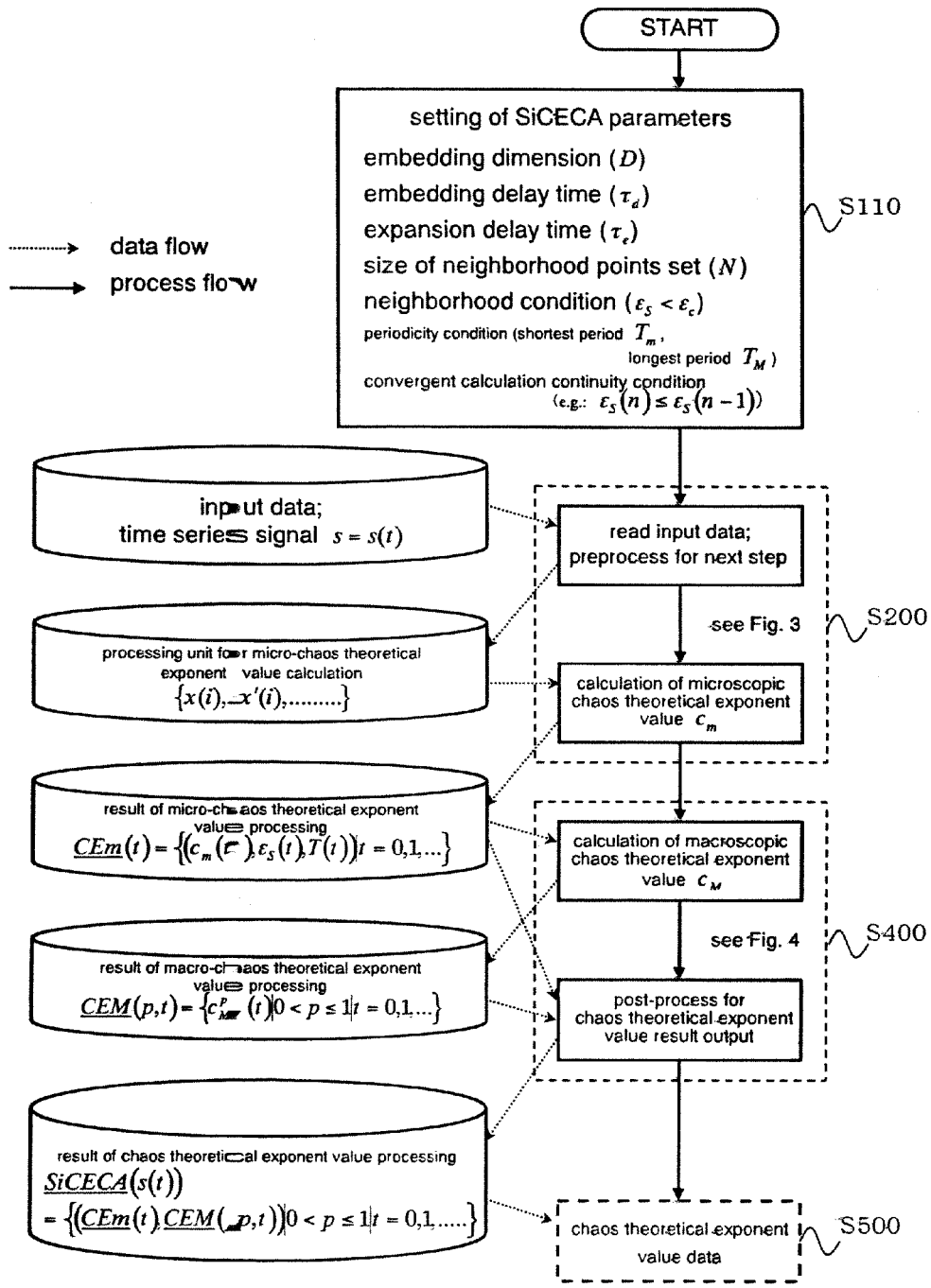
FIG. 2 is a flowchart showing an exemplary correspondence between the calculation processing of the chaos theoretical exponent value and the data in the inventive process.

It is certified that error appears in the above-identified patent and that said Letters Patent is hereby corrected as shown below:

Please delete Figure 2 in its entirety and insert the following:

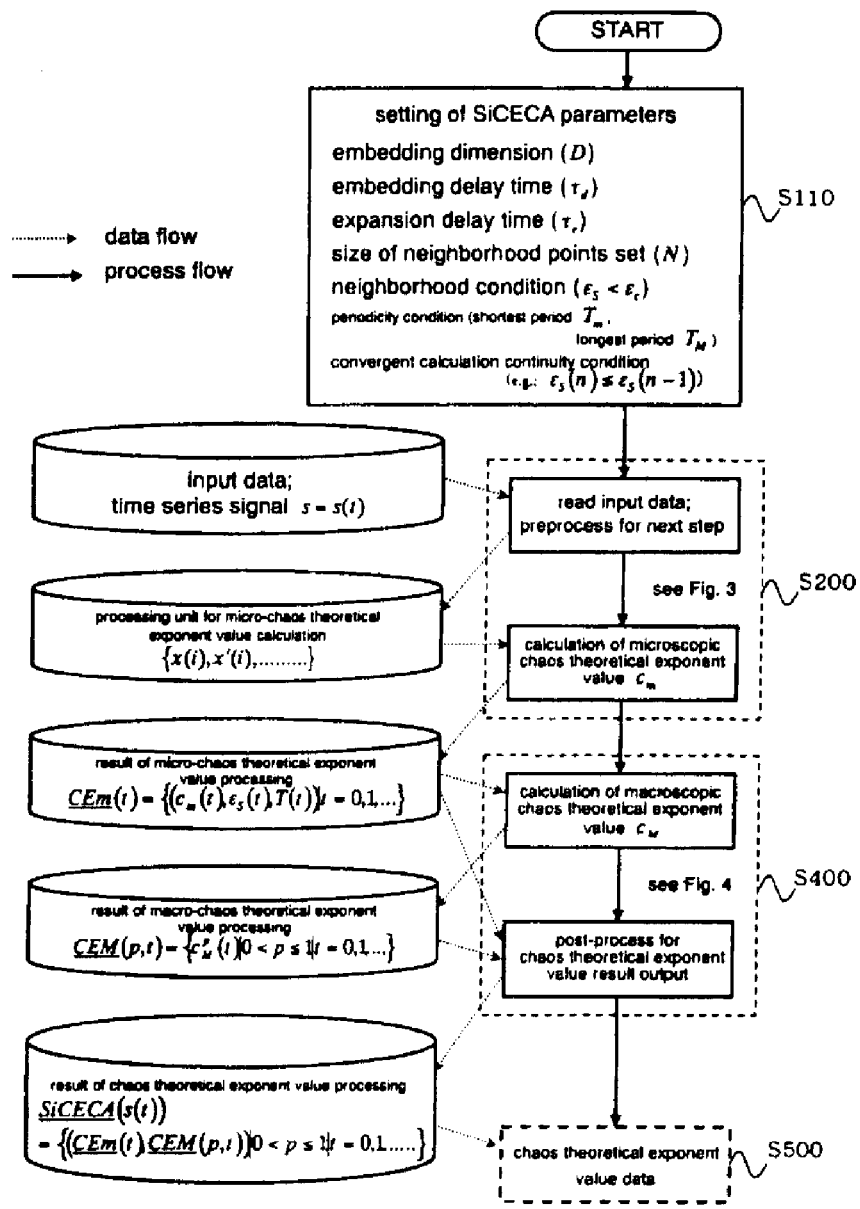

Fig. 2

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

It is certified that error appears in the above-identified patent and that said Letters Patent is hereby corrected as shown below:

Please delete Figure 3 in its entirety and insert the following:

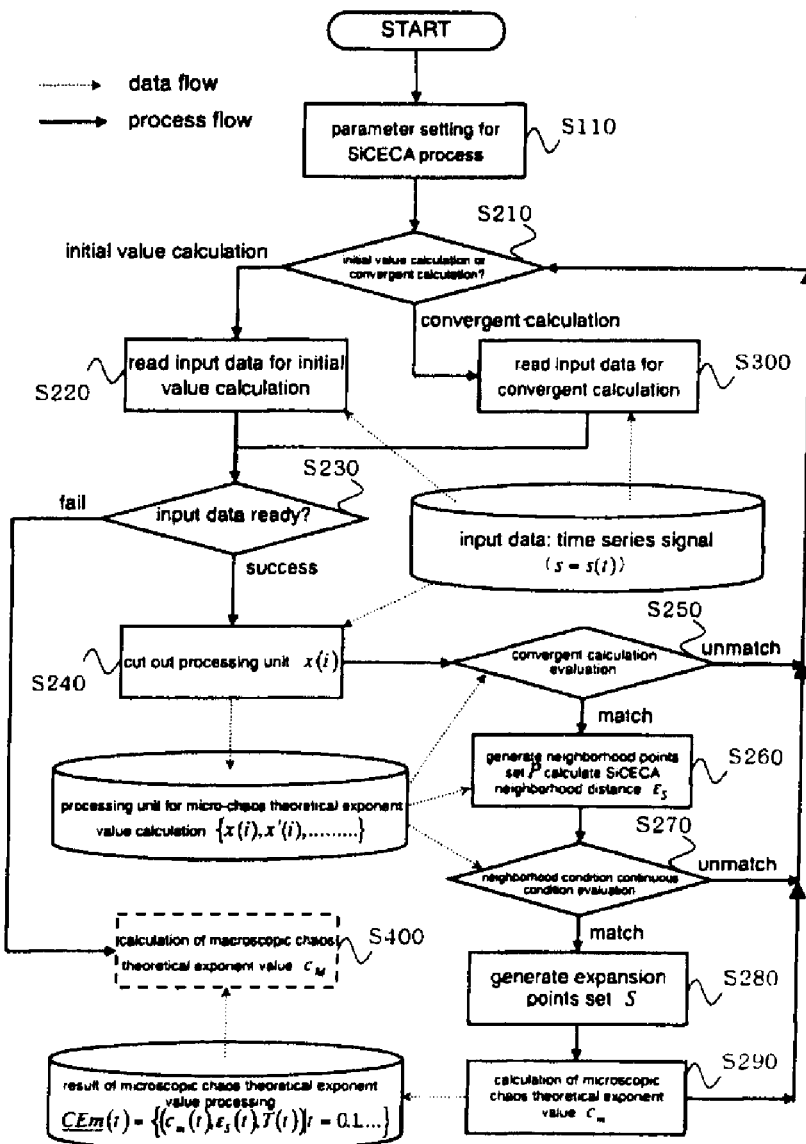

Fig. 3

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

Figure 4:
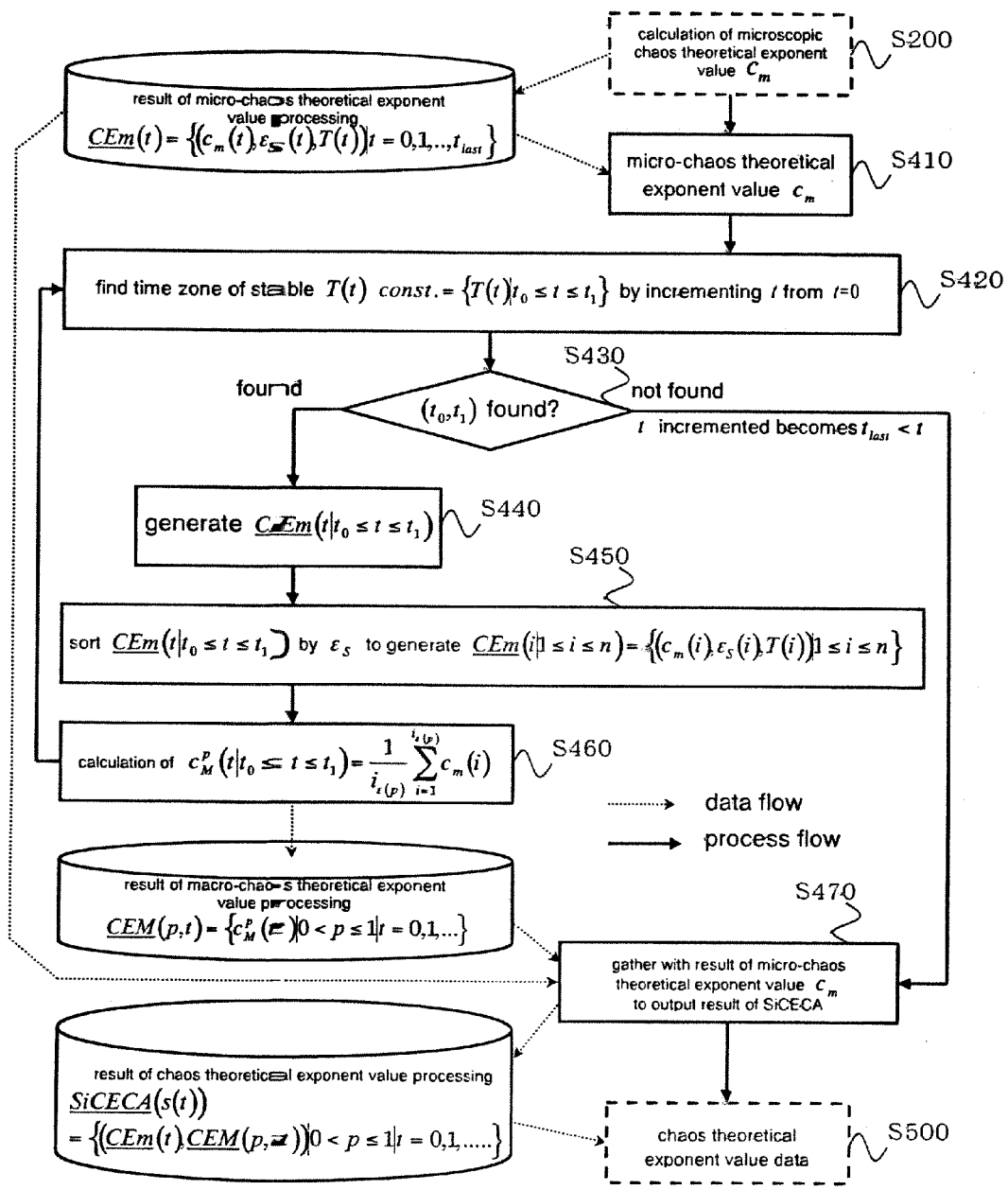
FIG. 4 is a flowchart showing an exemplary correspondence between the calculation processing of the macroscopic chaos theoretical exponent value and the data in the inventive process.
Figure 5:
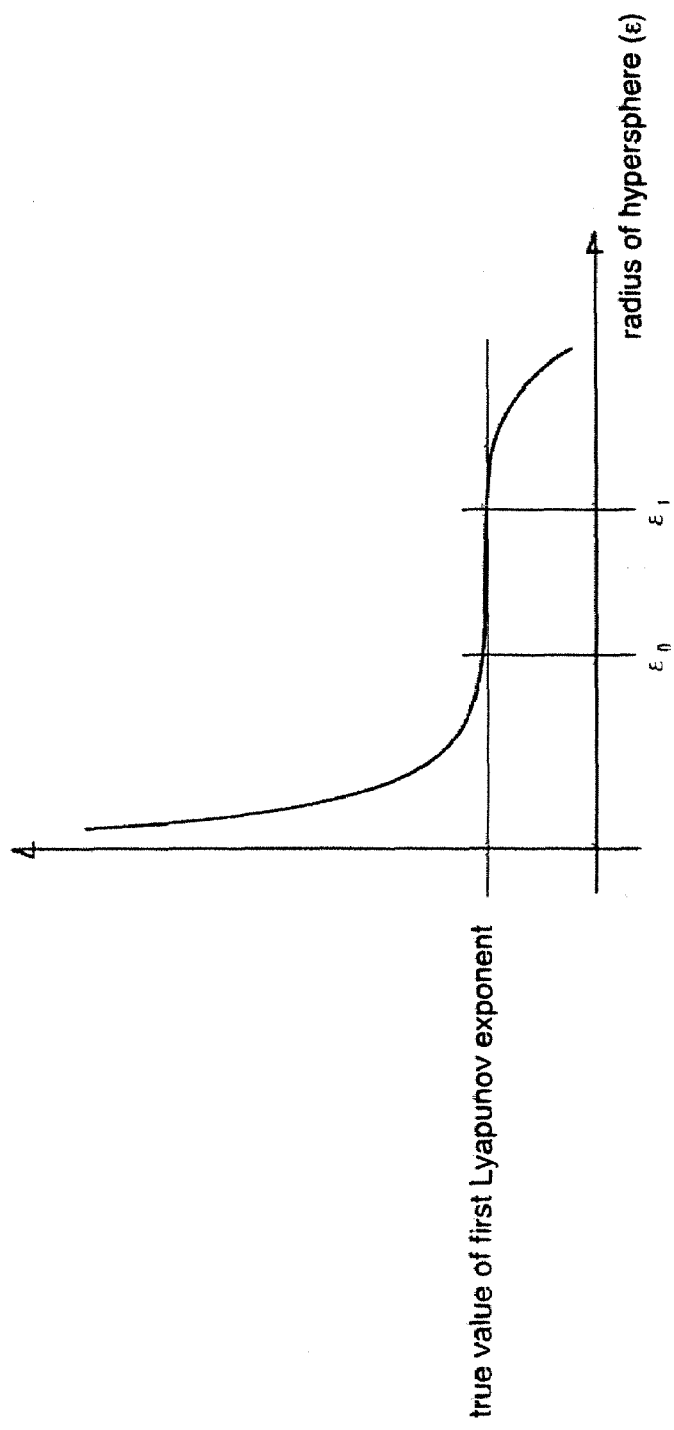
FIG. 5 is a schematic diagram showing the relationship between the radius of hypersphere in the noise-free time series signal and the first Lyapunov exponent.
Figure 6:
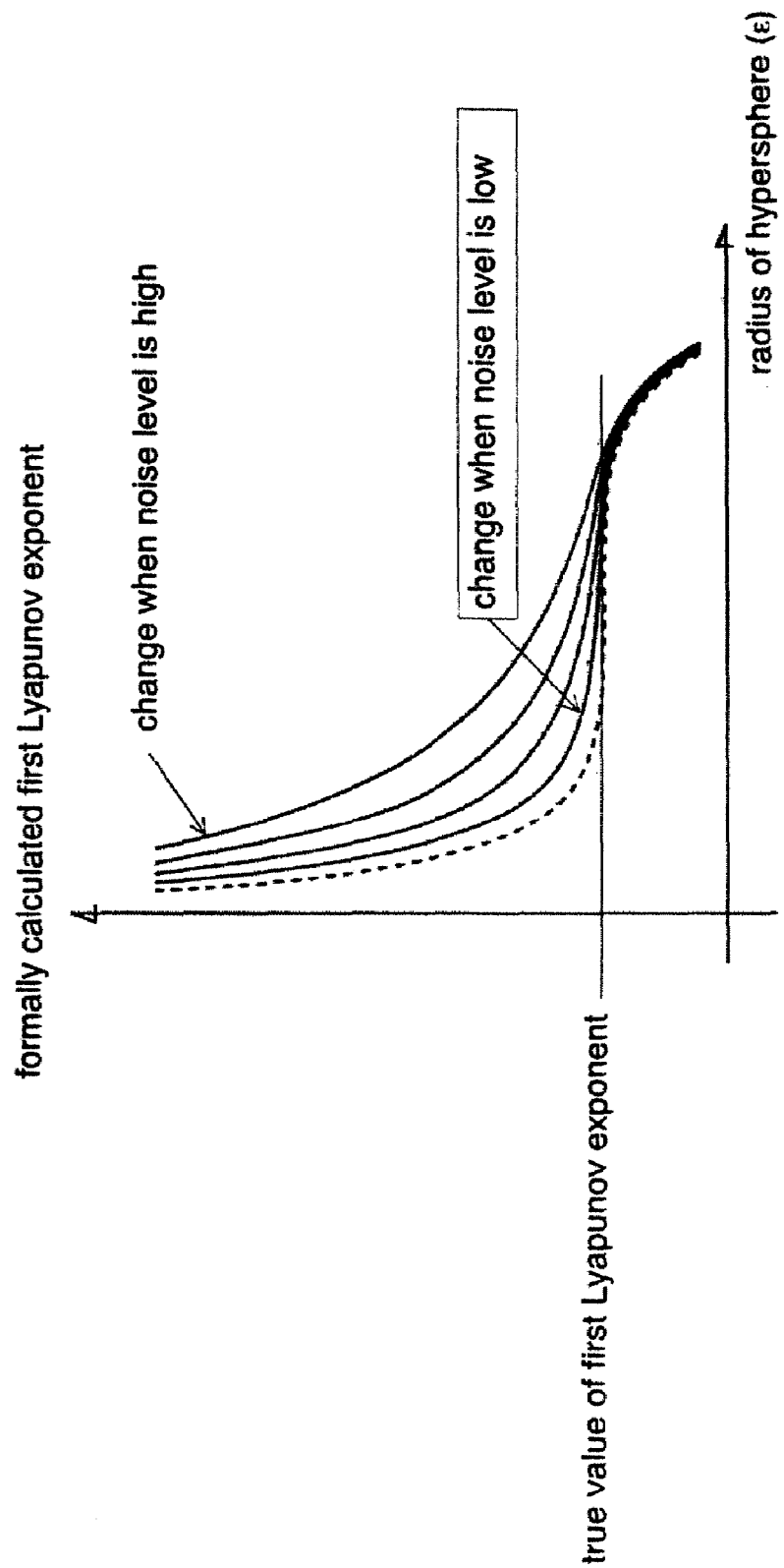
FIG. 6 is a schematic diagram showing the relationship between the radius of hypersphere that varies along with the difference of noise level and the first Lyapunov exponent.
Figure 7:
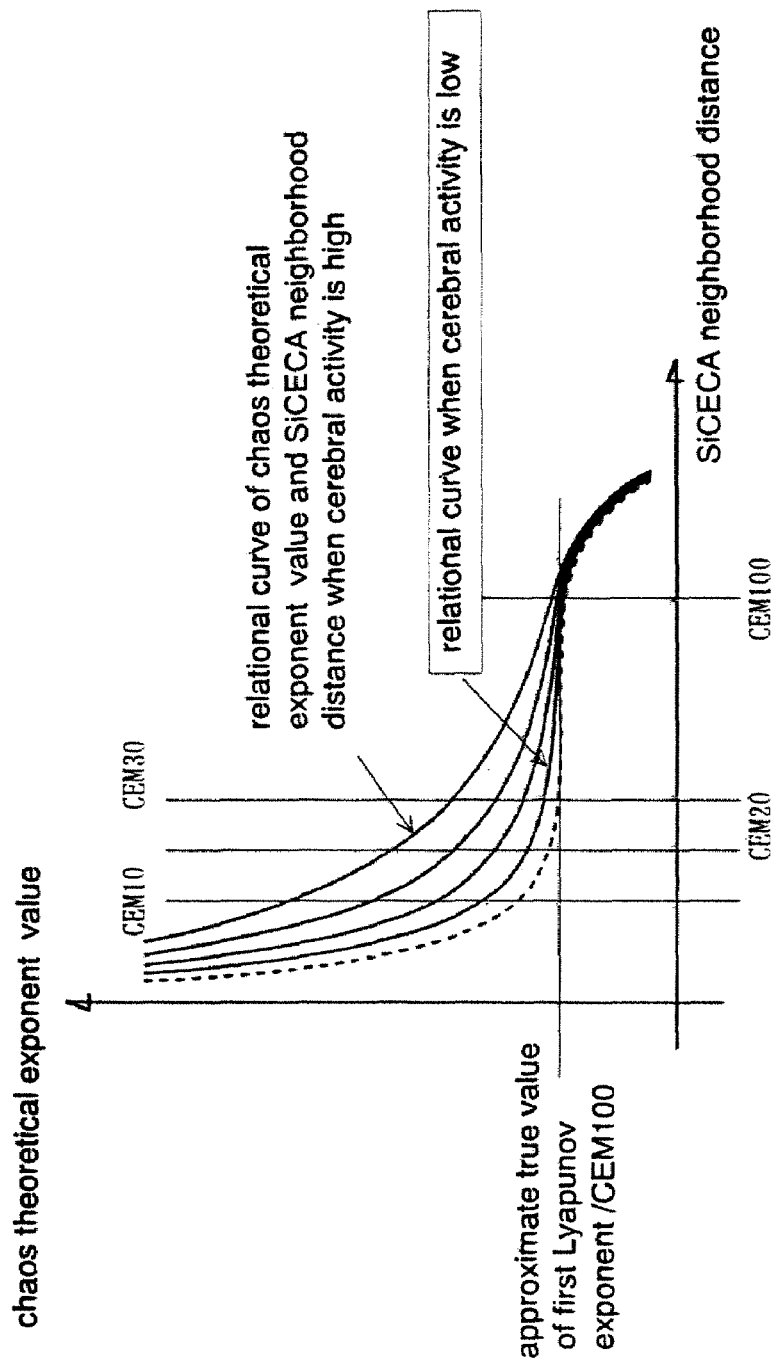
FIG. 7 is a schematic diagram showing the relationship between the chaos theoretical noise level of a speech voice and the chaos theoretical exponent value.

It is certified that error appears in the above-identified patent and that said Letters Patent is hereby corrected as shown below:

Please delete Figure 4 in its entirety and insert the following:

Fig. 4

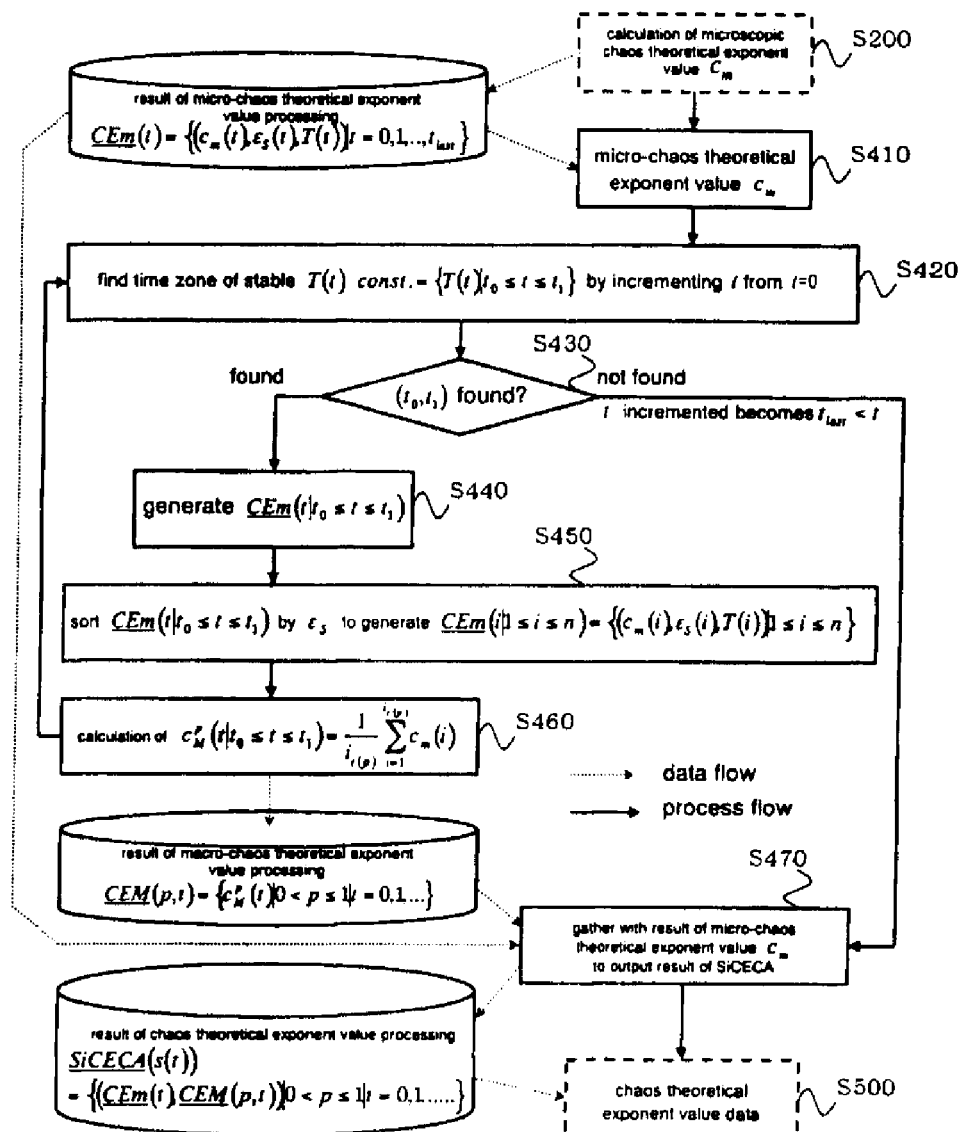

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

Figure 8:
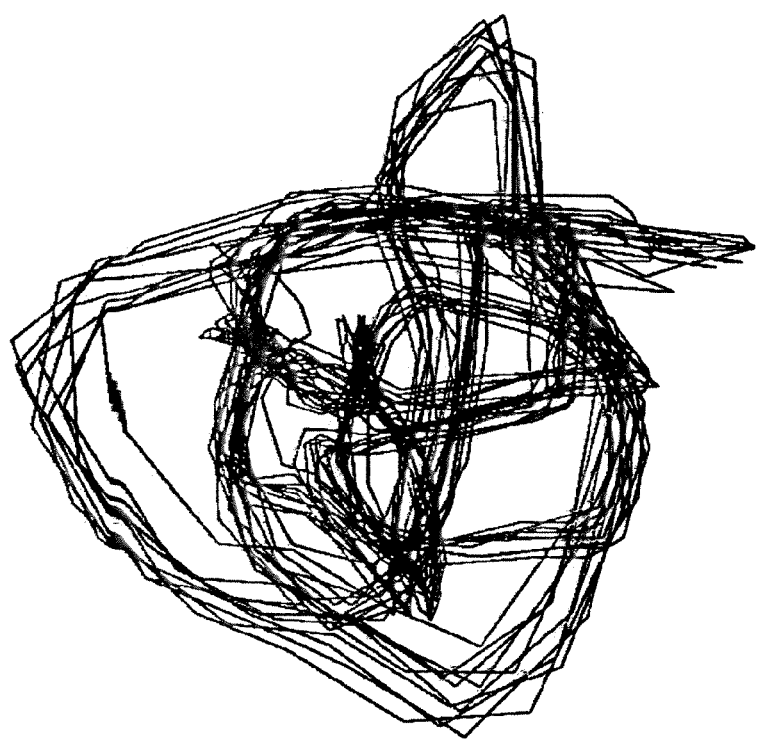
FIG. 8 is a diagram showing the shape of strange attractor of the phoneme /a/.
Figure 9:
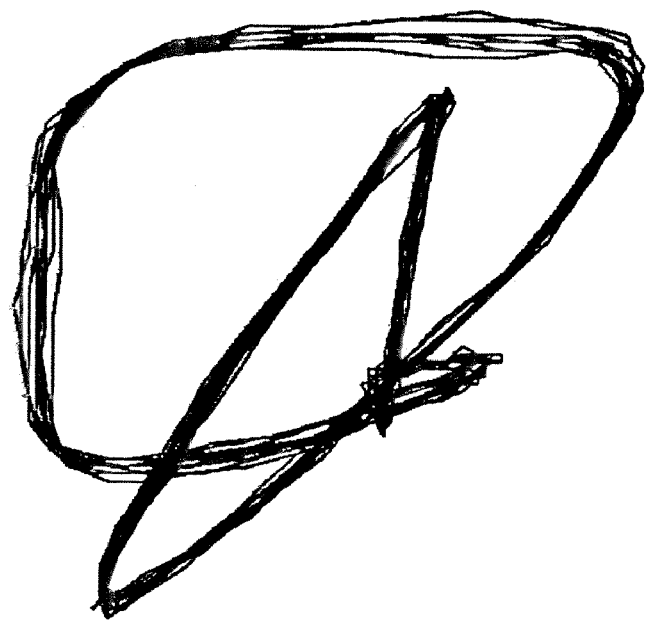
FIG. 9 is a diagram showing the shape of strange attractor of the phoneme /o/.

It is certified that error appears in the above-identified patent and that said Letters Patent is hereby corrected as shown below:

Please delete Figure 8 in its entirety and insert the following:

Fig. 8

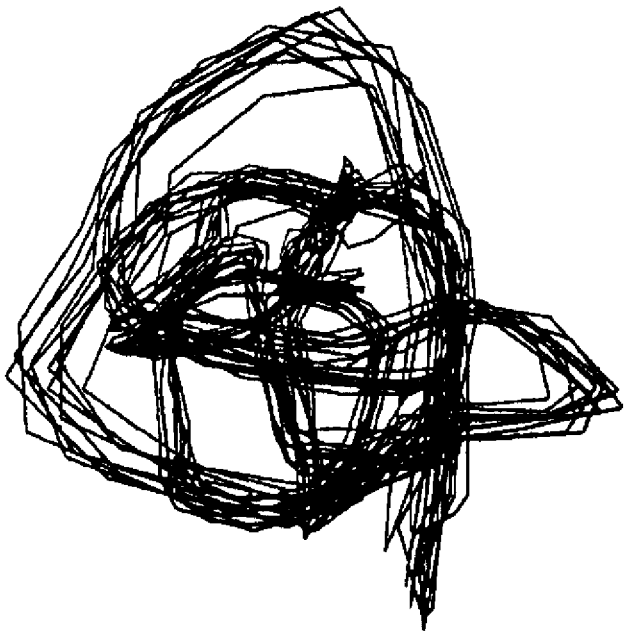

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

It is certified that error appears in the above-identified patent and that said Letters Patent is hereby corrected as shown below:

Column 7, line 38, "form a" should read --forma--.

Column 16, line 2, "$S_0,...,S_{(N-1)}$" should read --$S_1,...,S_{(N-1)}$--.

Column 16, line 10-11,

"$\vec{z}_j = \overline{S_0 S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e} + jT - x_{(D-1)\tau_d+\tau_e})$"

should read

--$\vec{z}_j = \overline{S_0 S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$--

Column 21, line 15 "$C_m(t)$" should read --"$C_M(t)$"--.

Claim 3, column 31, lines 13-14,

"$\vec{z}_j = \overline{S_0 S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$"

should read

--$\vec{z}_j = \overline{S_0 S_j} = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$--

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

It is certified that error appears in the above-identified patent and that said Letters Patent is hereby corrected as shown below:

Claim 4, column 31, line 31, "$P=\{P_0, P_1, P_{(N-1)}\}$" should read --$P=\{P_0, P_1, \ldots, P_{(N-1)}\}$--.

Claim 4, column 31, lines 66-67,

" $S_{(N-1)} = (X_{\tau_e+(N-1)T}, X_{\tau_d+\tau_e+(N-1)T}, X_{2\tau_d+\tau_e+(N+1)T}, \cdots ,$
$X_{(D-1)\tau_d+\tau_e+(N-1)T})$ "

should read

-- $S_{(N-1)} = (X_{\tau_e+(N-1)T}, X_{\tau_d+\tau_e+(N-1)T}, X_{2\tau_d+\tau_e+(N-1)T}, \cdots ,$
$X_{(D-1)\tau_d+\tau_e+(N-1)T})$ --

Claim 5, column 32, line 22, "Cm" should read --$C_m$--.

Claim 22, column 35, line 33, "claim 18," should read --claim 21,--.

UNITED STATES PATENT AND TRADEMARK OFFICE
CERTIFICATE OF CORRECTION

| | | |
|---|---|---|
| PATENT NO. | : 7,321,842 B2 | |
| APPLICATION NO. | : 10/546479 | |
| DATED | : January 22, 2008 | |
| INVENTOR(S) | : Shiomi et al. | |

It is certified that error appears in the above-identified patent and that said Letters Patent is hereby corrected as shown below:

Delete Title Page in its entirety, and insert attached Title Page.

Title page, item (73), line 3, "Admiinistrative" should read --Administrative--.

UNITED STATES PATENT AND TRADEMARK OFFICE
CERTIFICATE OF CORRECTION

| | |
|---|---|
| PATENT NO. | : 7,321,842 B2 |
| APPLICATION NO. | : 10/546479 |
| DATED | : January 22, 2008 |
| INVENTOR(S) | : Shiomi et al. |

It is certified that error appears in the above-identified patent and that said Letters Patent is hereby corrected as shown below:

Please delete Figure 1 in its entirety and insert the following:

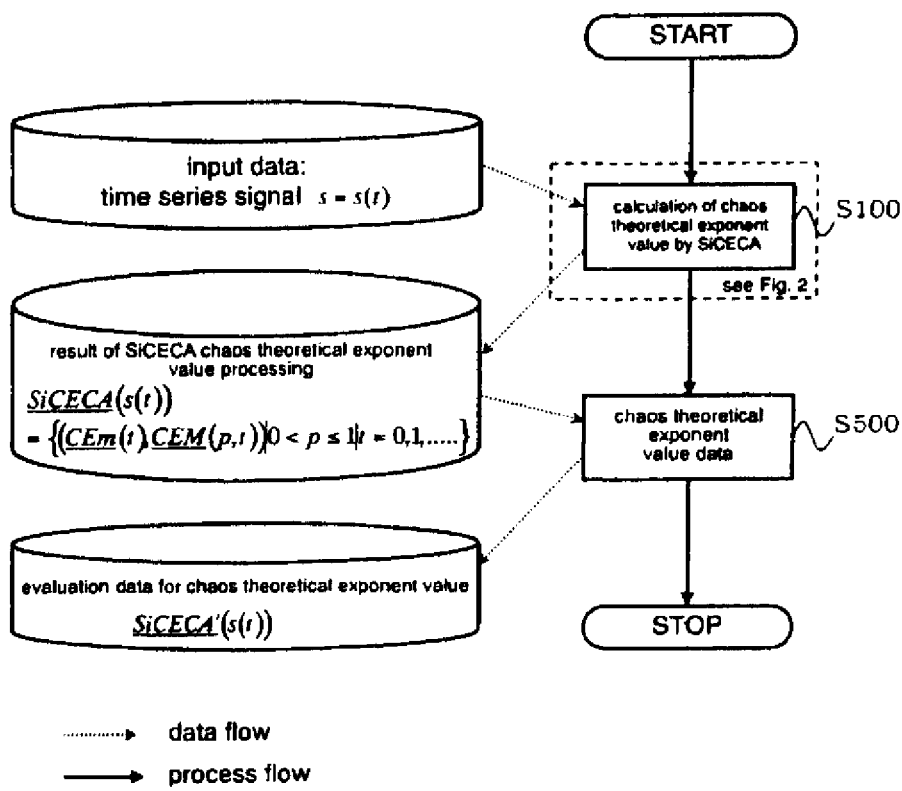

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

It is certified that error appears in the above-identified patent and that said Letters Patent is hereby corrected as shown below:

Please delete Figure 2 in its entirety and insert the following:

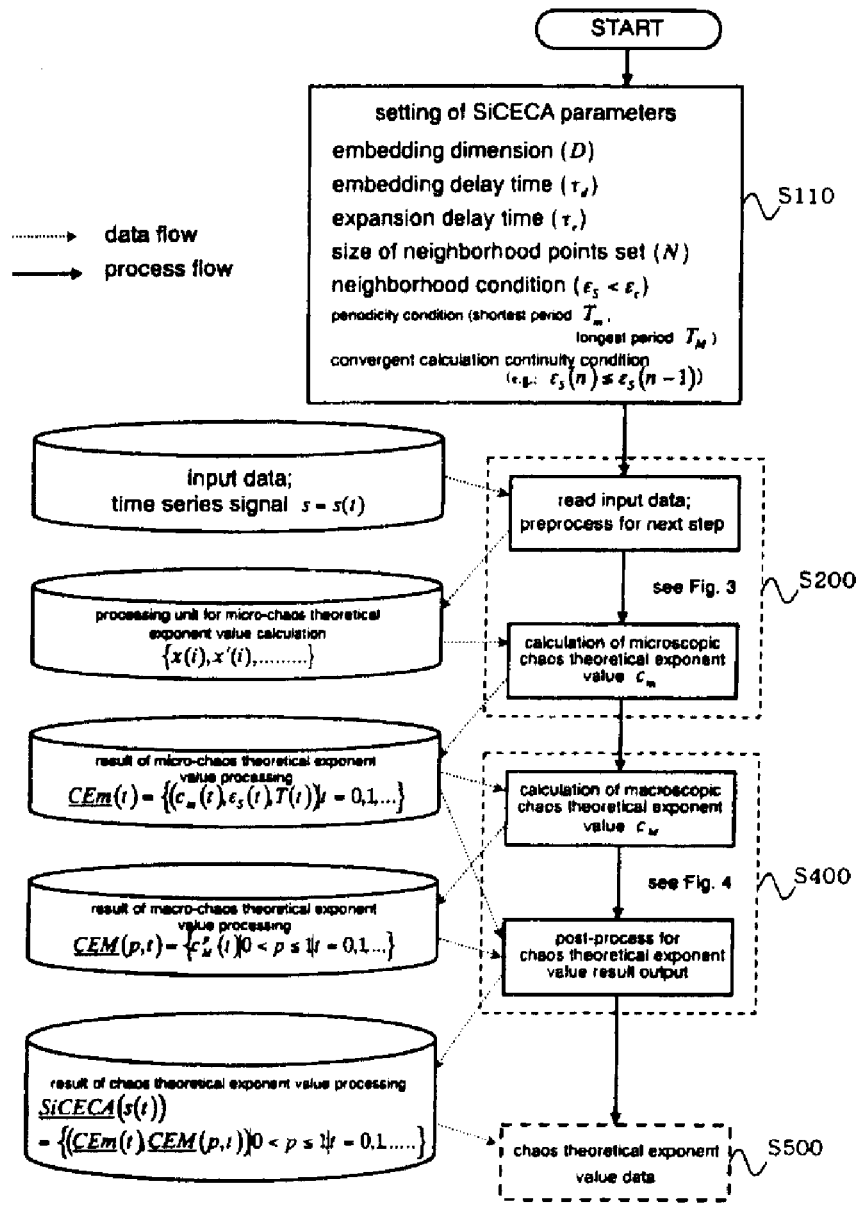

UNITED STATES PATENT AND TRADEMARK OFFICE
CERTIFICATE OF CORRECTION

PATENT NO.        : 7,321,842 B2
APPLICATION NO.   : 10/546479
DATED             : January 22, 2008
INVENTOR(S)       : Shiomi et al.

It is certified that error appears in the above-identified patent and that said Letters Patent is hereby corrected as shown below:

Please delete Figure 3 in its entirety and insert the following:

Fig. 3

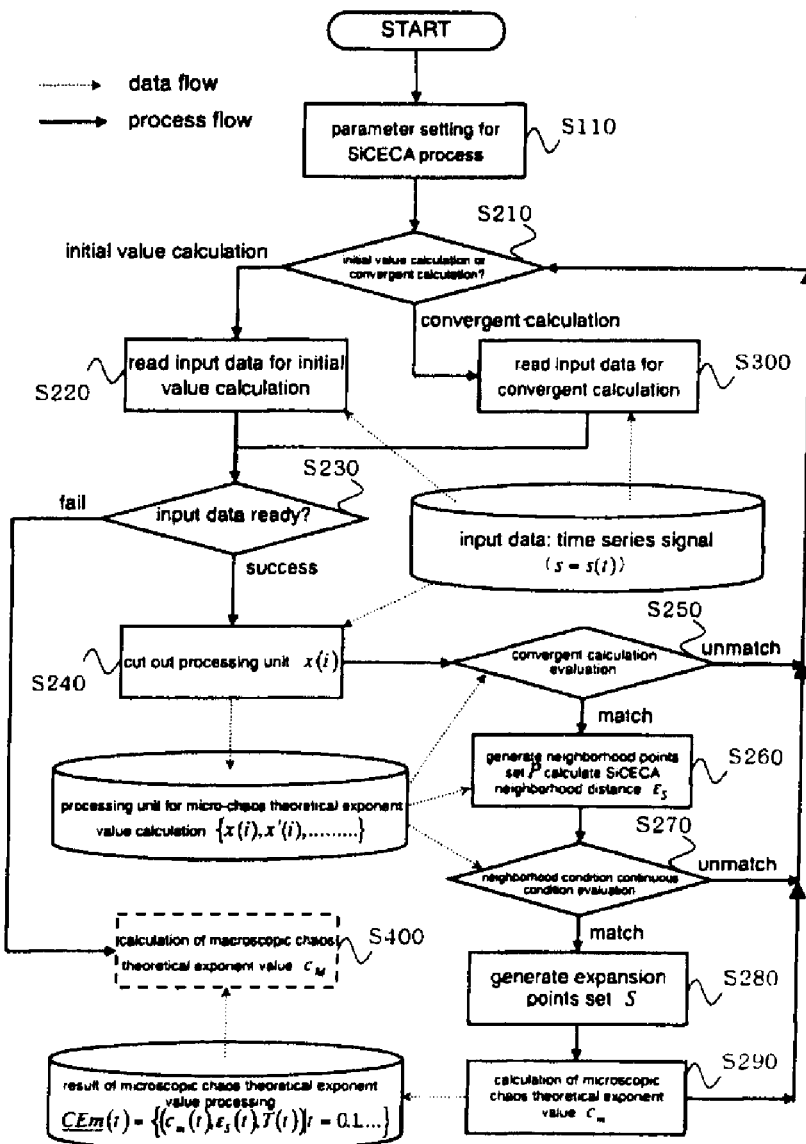

UNITED STATES PATENT AND TRADEMARK OFFICE
CERTIFICATE OF CORRECTION

PATENT NO. : 7,321,842 B2  Page 5 of 9
APPLICATION NO. : 10/546479
DATED : January 22, 2008
INVENTOR(S) : Shiomi et al.

It is certified that error appears in the above-identified patent and that said Letters Patent is hereby corrected as shown below:

Please delete Figure 4 in its entirety and insert the following:

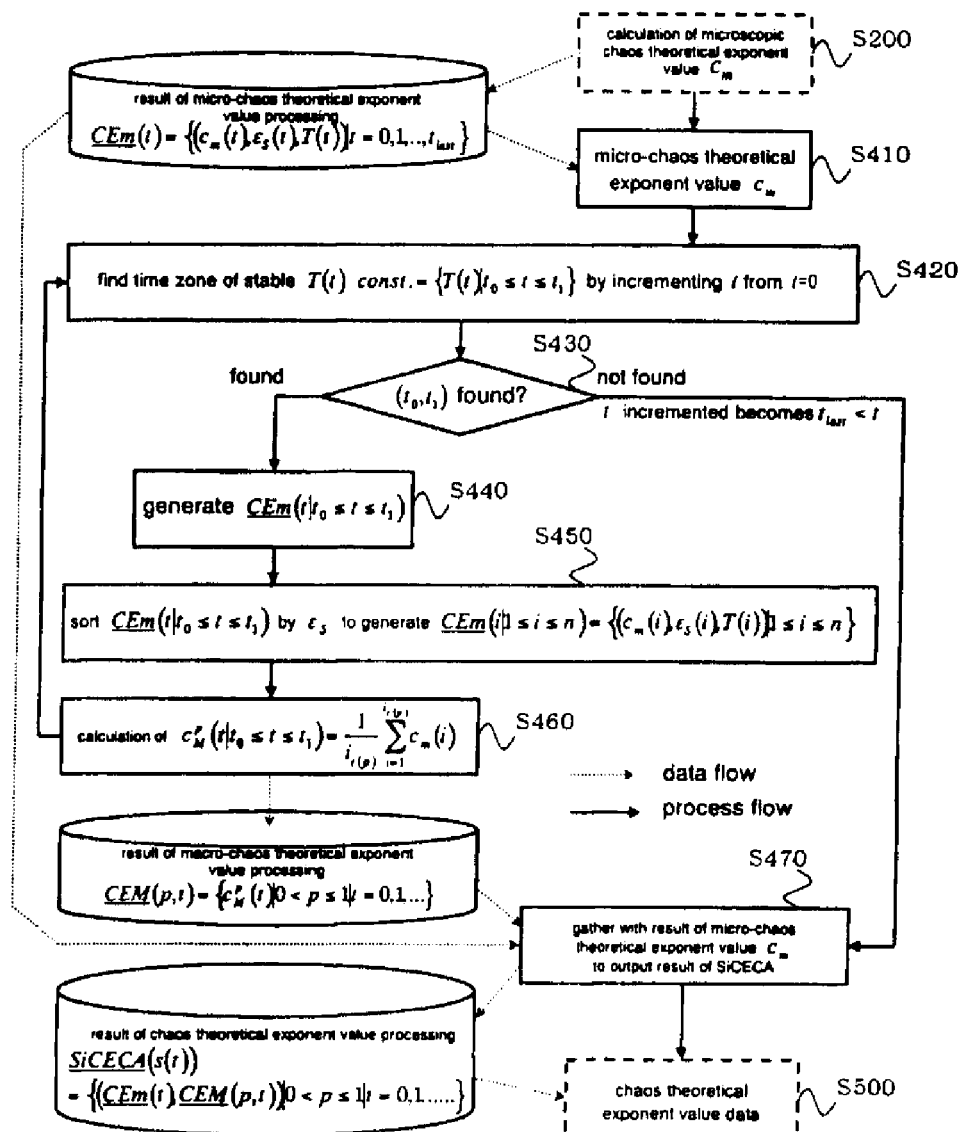

Fig. 4

UNITED STATES PATENT AND TRADEMARK OFFICE
CERTIFICATE OF CORRECTION

PATENT NO. : 7,321,842 B2  Page 6 of 9
APPLICATION NO. : 10/546479
DATED : January 22, 2008
INVENTOR(S) : Shiomi et al.

It is certified that error appears in the above-identified patent and that said Letters Patent is hereby corrected as shown below:

Please delete Figure 8 in its entirety and insert the following:

Fig. 8

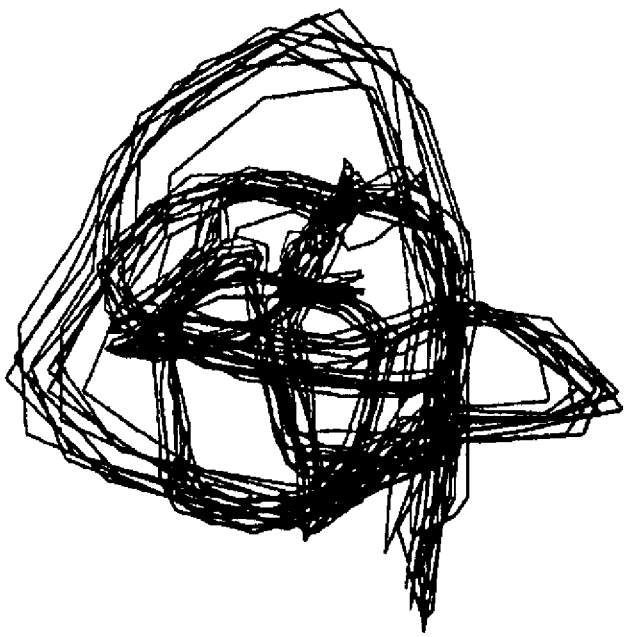

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

It is certified that error appears in the above-identified patent and that said Letters Patent is hereby corrected as shown below:

Column 7, line 38, "form a" should read --forma--.

Column 16, line 2, "$S0,...,S_{(N-1)}$" should read --$S_1,...,S_{(N-1)}$--.

Column 16, line 10-11,

"$$\vec{z}_j = \overline{S_0}\vec{S}_j = (x_{\tau_e+jT} - x_{0+\tau_e}, x_{\tau_d+\tau_e+jT} - x_{\tau_d+\tau_e}, \ldots, x_{(D-1)\tau_d+\tau_e+} jT - x_{(D-1)\tau_d+\tau_e})$$"

should read $$\vec{z}_j = \overline{S_0}\vec{S}_j = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$$

--

Column 21, line 15 "$C_m(t)$" should read --"$C_M(t)$"--.

Claim 3, column 31, lines 13-14,

"$$\vec{z}_j = \overline{S_0}\vec{S}_j = (x_{\tau_e+jT} - x_{0+\tau_e}, x_{\tau_d+\tau_e+jT} - x_{\tau_d+\tau_e}, \ldots, x_{(D-1)\tau_d+\tau_e} jT - x_{(D-1)\tau_d+\tau_e})$$"

should read $$\vec{z}_j = \overline{S_0}\vec{S}_j = (x_{\tau_e+jT} - x_{0+\tau_e}, x_{\tau_d+\tau_e+jT} - x_{\tau_d+\tau_e}, \ldots, x_{(D-1)\tau_d+\tau_e+jT} - x_{(D-1)\tau_d+\tau_e})$$

UNITED STATES PATENT AND TRADEMARK OFFICE
CERTIFICATE OF CORRECTION

PATENT NO. : 7,321,842 B2
APPLICATION NO. : 10/546479
DATED : January 22, 2008
INVENTOR(S) : Shiomi et al.

It is certified that error appears in the above-identified patent and that said Letters Patent is hereby corrected as shown below:

Claim 4, column 31, line 31, "P={$P_0$, $P_1$, $P_{(N-1)}$}" should read --P={$P_0$, $P_1$, ..., $P_{(N-1)}$}--.

Claim 4, column 31, lines 66-67,

" $S_{(N-1)} = (X_{\tau_e+(N-1)T}, X_{\tau_d+\tau_e+(N-1)T}, X_{2\tau_d+\tau_e+(N+1)T}, \cdots,$
$X_{(D-1)\tau_d+\tau_e+(N-1)T})$ "

should read

-- $S_{(N-1)} = (X_{\tau_e+(N-1)T}, X_{\tau_d+\tau_e+(N-1)T}, X_{2\tau_d+\tau_e+(N-1)T}, \cdots,$
$X_{(D-1)\tau_d+\tau_e+(N-1)T})$ --

Claim 5, column 32, line 22, "Cm" should read --$C_m$--.

Claim 22, column 35, line 33, "claim 18," should read --claim 21,--.

This certificate supersedes the Certificate of Correction issued May 5, 2009.

Signed and Sealed this

Twenty-sixth Day of May, 2009

JOHN DOLL
*Acting Director of the United States Patent and Trademark Office*

United States Patent
Shiomi et al.

(10) Patent No.: US 7,321,842 B2
(45) Date of Patent: Jan. 22, 2008

(54) CHAOS INDEX VALUE CALCULATION SYSTEM

(75) Inventors: Kakuichi Shiomi, 401, Metro Building, 5-11, Higashi-shimbashi 2-chome, Minato-ku, Tokyo, 105-0021 (JP); Susumu Kobayashi, Migawa-Mansion 206, 85-2, Migawa 2-chome, Mito-shi, Ibaraki 310-0912 (JP)

(73) Assignees: Electronic Navigation Research Institute, an Independent Administrative Institution, Tokyo (JP), part interest; Kakuichi Shiomi, Tokyo (JP), part interest; Susumu Kobayashi, Ibaraki (JP), part interest ( * ) Notice: Subject to any disclaimer, the term of this patent is extended or adjusted under 35 U.S.C. 154(b) by 0 days.

(21) Appl. No.: 10/546,479
(22) PCT Filed: Dec. 26, 2003
(86) PCT No.: PCT/JP03/16954
§ 371 (c)(1),
(2), (4) Date: Jul. 21, 2006
(87) PCT Pub. No.: WO2004/075074

PCT Pub. Date: Sep. 2, 2004

(65) Prior Publication Data
US 2006/0265444 A1 Nov. 23, 2006
US 2007/0174377 A2 Jul. 26, 2007

(30) Foreign Application Priority Data
Feb. 24, 2003 (JP) .......................... 2003-045386

(51) Int. Cl. *G06F 19/00* (2006.01)
(52) U.S. Cl. .................................. 702/181; 714/25
(58) Field of Classification Search .......... 702/181, 702/182–185; 714/4, 100, 5, 25, 30, 48
See application file for complete search history.

(56) References Cited

U.S. PATENT DOCUMENTS
6,422,998 B1 * 7/2002 Vo-Dinh et al. ............ 600/300
6,904,390 B2 * 6/2005 Nikitin et al. ............. 702/188

FOREIGN PATENT DOCUMENTS
JP 7116119 5/1995
(Continued)

OTHER PUBLICATIONS

M. Sano and Y. Sawada "Measurement of the Lyapunov Spectrum from a Chaotic Time Series," Physical Review Letters, vol. 55, No. 10, Sep. 2, 1985, pp. 1082-1085.

(Continued)

*Primary Examiner*—Edward Raymond
(74) *Attorney, Agent, or Firm*—Finnegan, Henderson, Farabow, Garrett & Dunner, L.L.P.

(57) ABSTRACT

The present invention provides a system for analyzing a time series signal by a method of Chaos Theory and calculating a chaos theoretical exponent value.

It is a chaos theoretical exponent value calculation system comprising: a means for receiving an input of predetermined parameters, a means for reading a time series signal, a means for cutting out from the read time series signal a time series signal for each processing unit $x=x(i)$, a means for calculating a chaos theoretical exponent value of the read time series signal, and a means for outputting a chaos theoretical exponent value of the calculated time series signal, wherein the means for calculating a chaos theoretical exponent value comprises: a means for calculating a chaos theoretical exponent value for a sampling time in a time series signal of the cut-out processing unit $x=x(i)$, and a means for calculating, based on the chaos theoretical exponent value for the sampling time, a chaos theoretical exponent value of a time series signal for a predetermined time.

27 Claims, 12 Drawing Sheets